INVENTOR
Horace L. Smith, Jr.

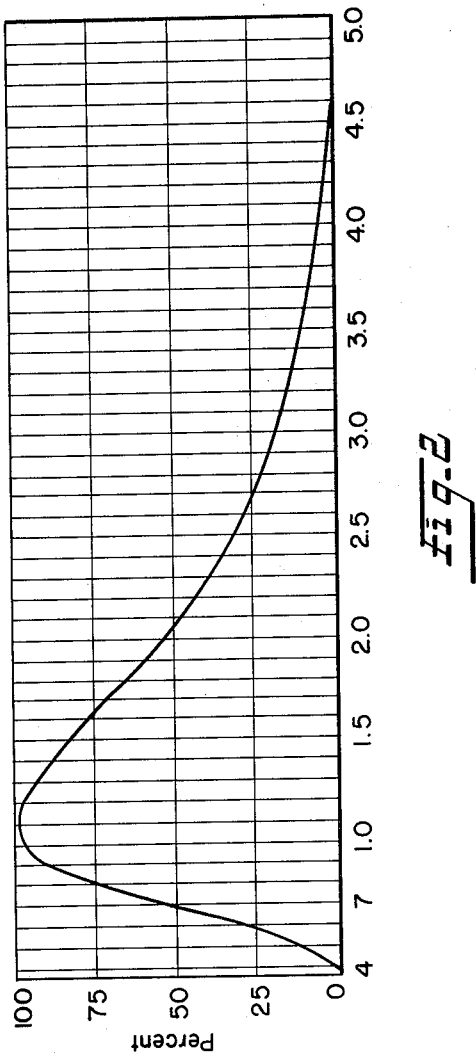

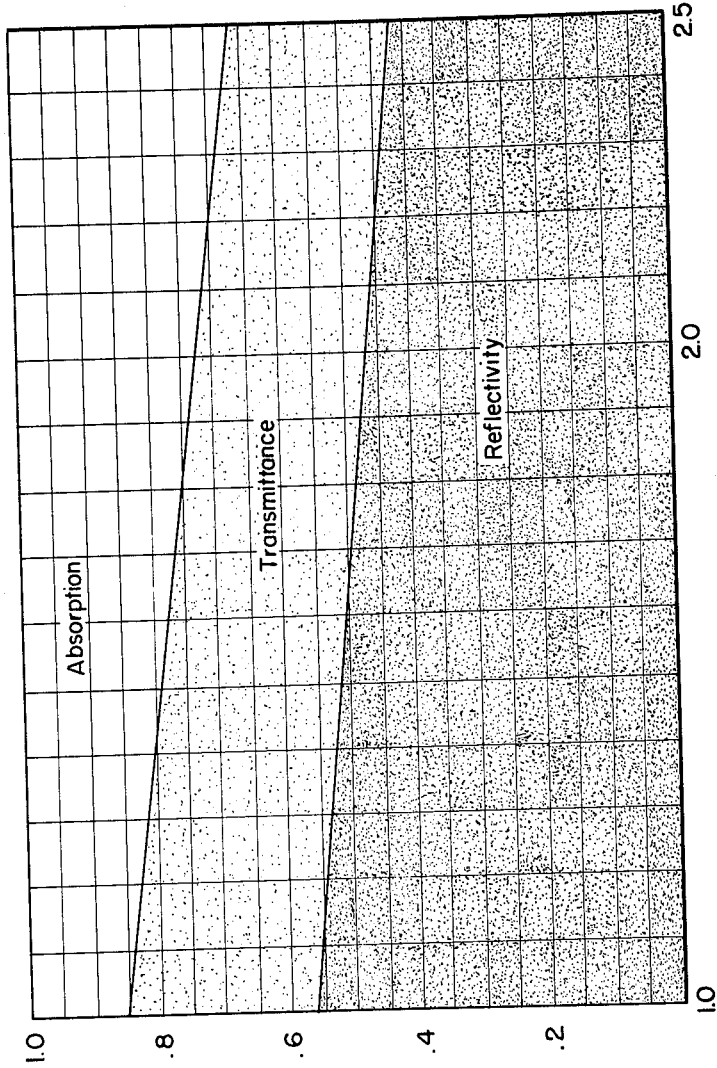

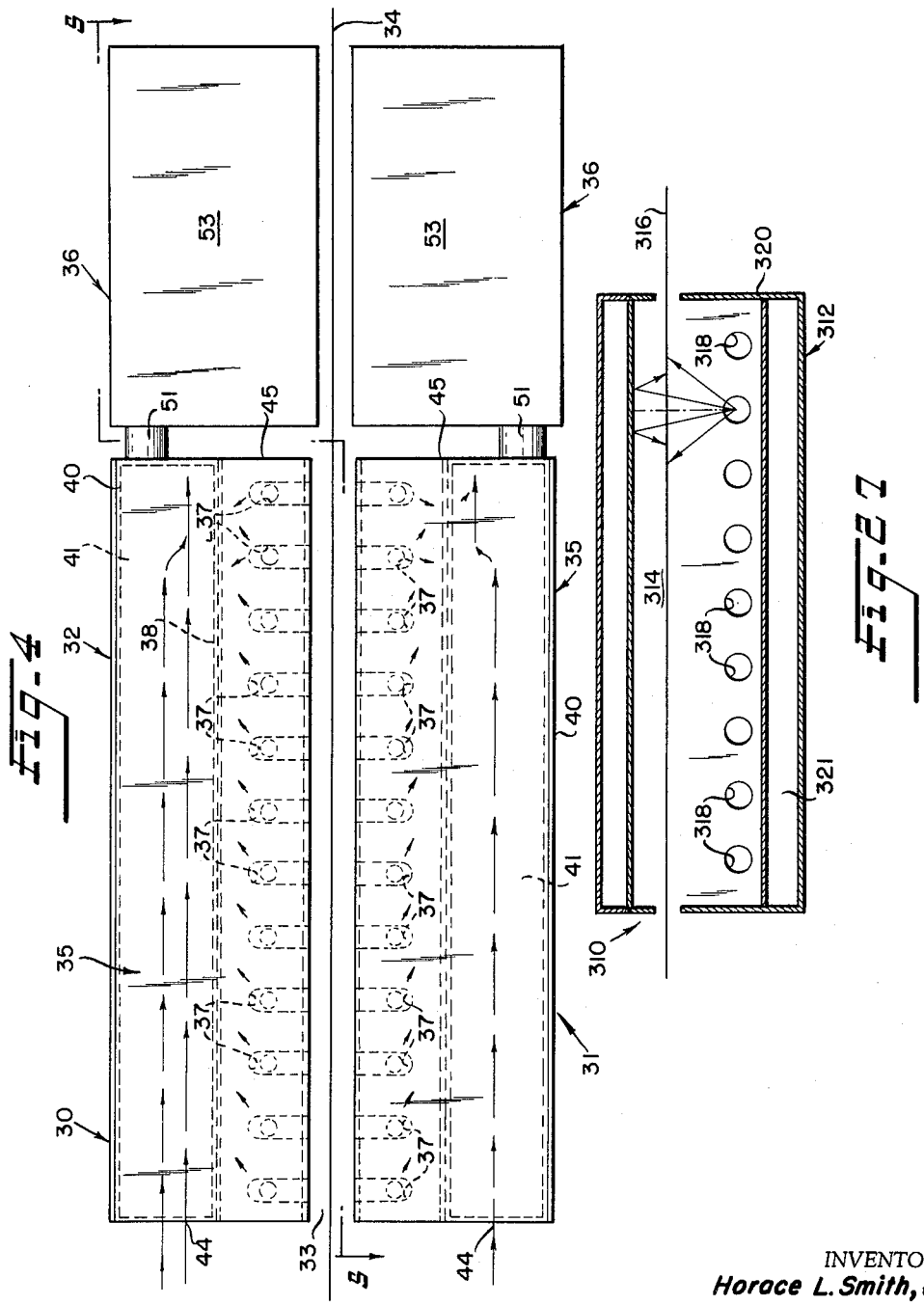

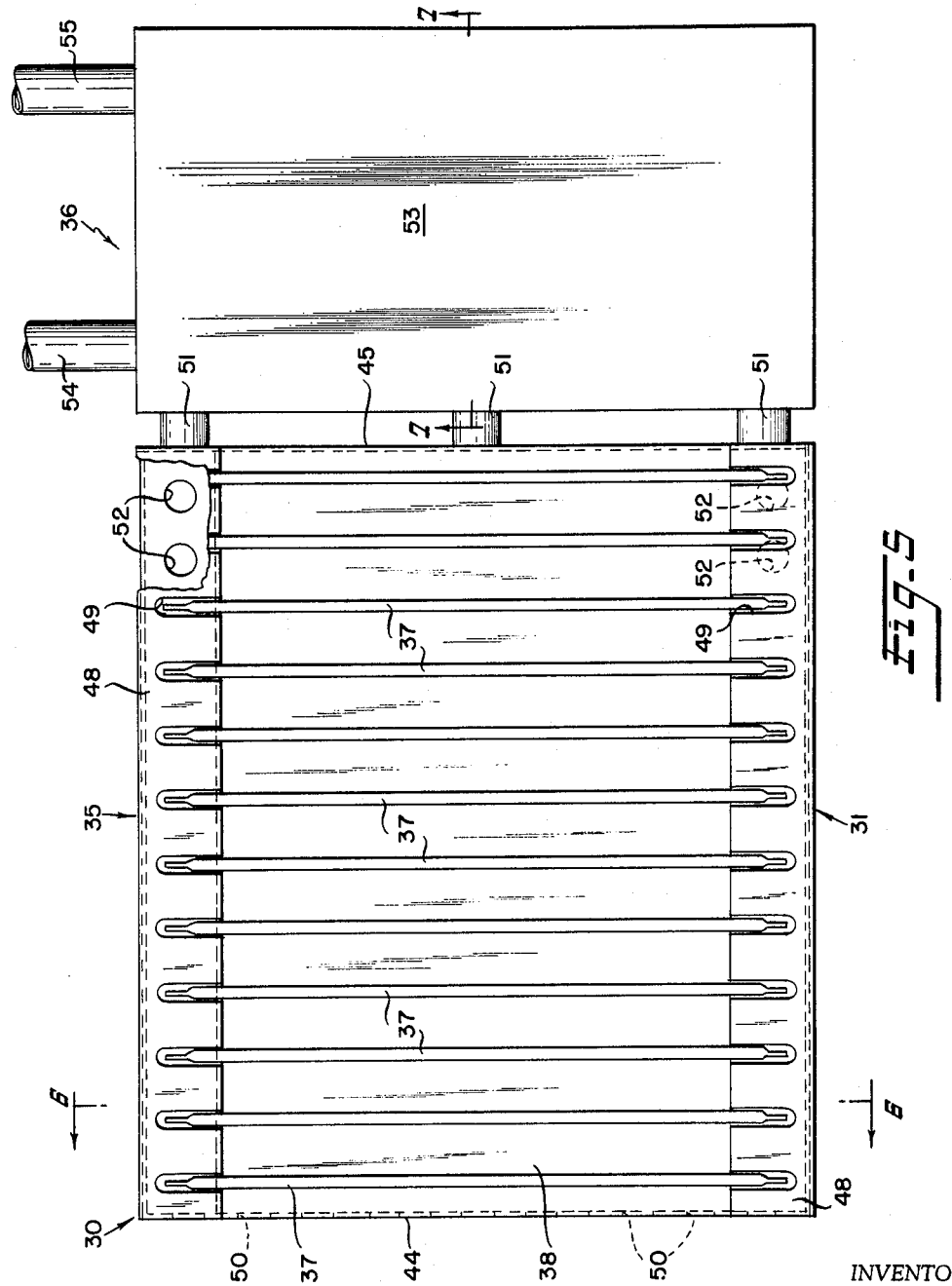

March 1, 1966  H. L. SMITH, JR  3,237,314
PROCESS OF DRYING ONE OR MORE MATERIALS IMPREGNATED IN OR
ON A TRAVELING CARRIER
Filed March 4, 1963  18 Sheets-Sheet 6
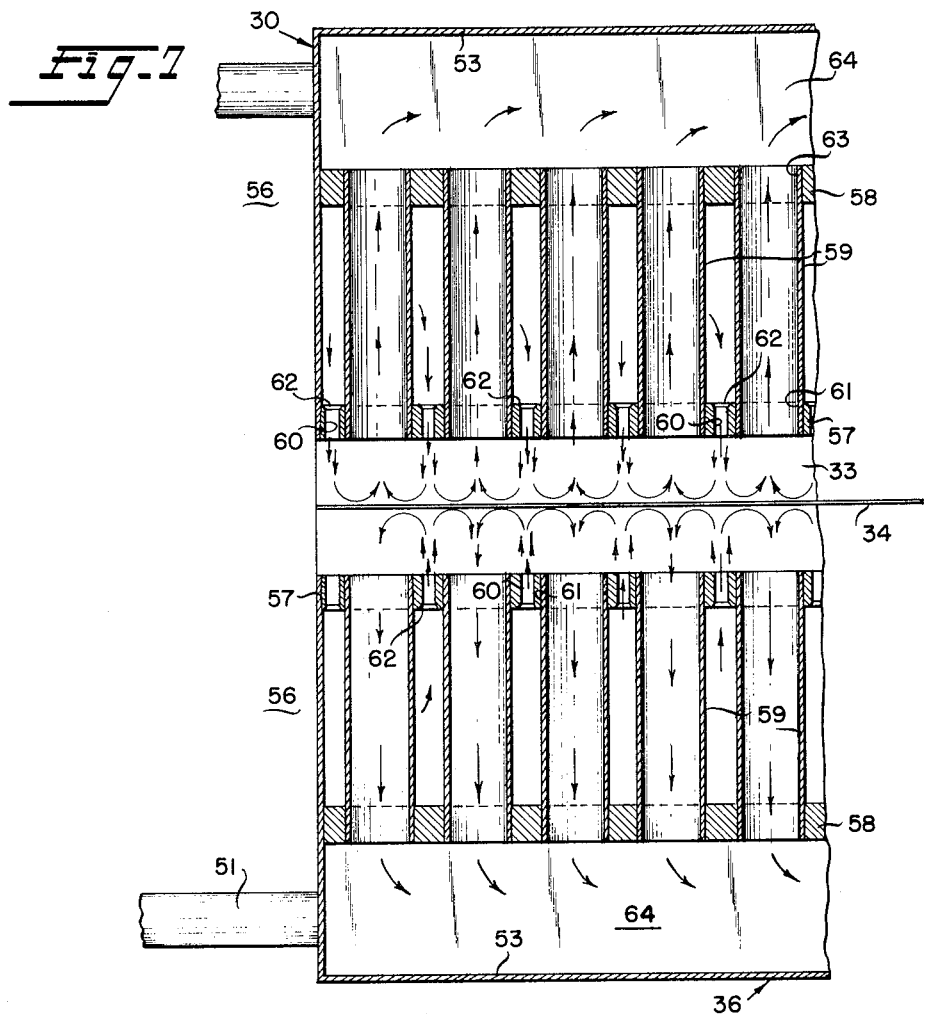
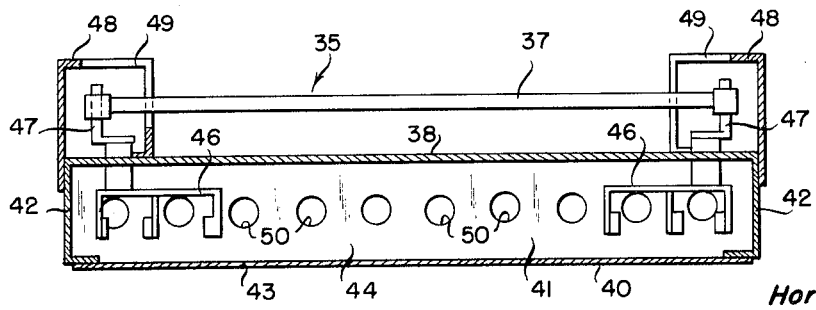
INVENTOR
Horace L. Smith, Jr.
BY
ATTORNEYS March 1, 1966  H. L. SMITH, JR  3,237,314
PROCESS OF DRYING ONE OR MORE MATERIALS IMPREGNATED IN OR
ON A TRAVELING CARRIER
Filed March 4, 1963  18 Sheets-Sheet 7

INVENTOR
Horace L. Smith, Jr.

BY
ATTORNEYS

March 1, 1966   H. L. SMITH, JR   3,237,314
PROCESS OF DRYING ONE OR MORE MATERIALS IMPREGNATED IN OR
ON A TRAVELING CARRIER
Filed March 4, 1963   18 Sheets-Sheet 8
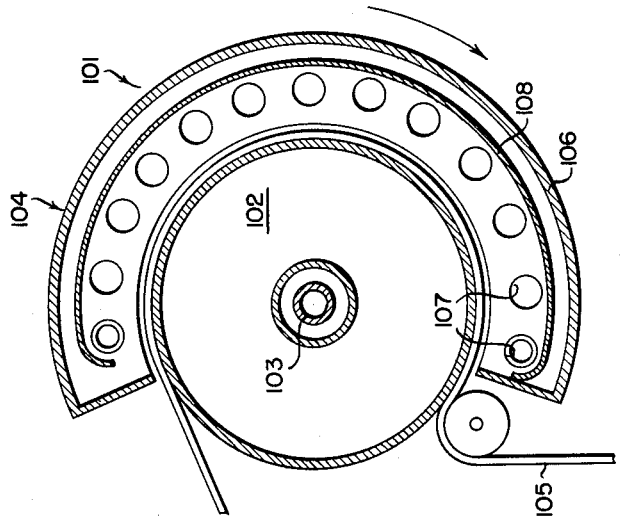
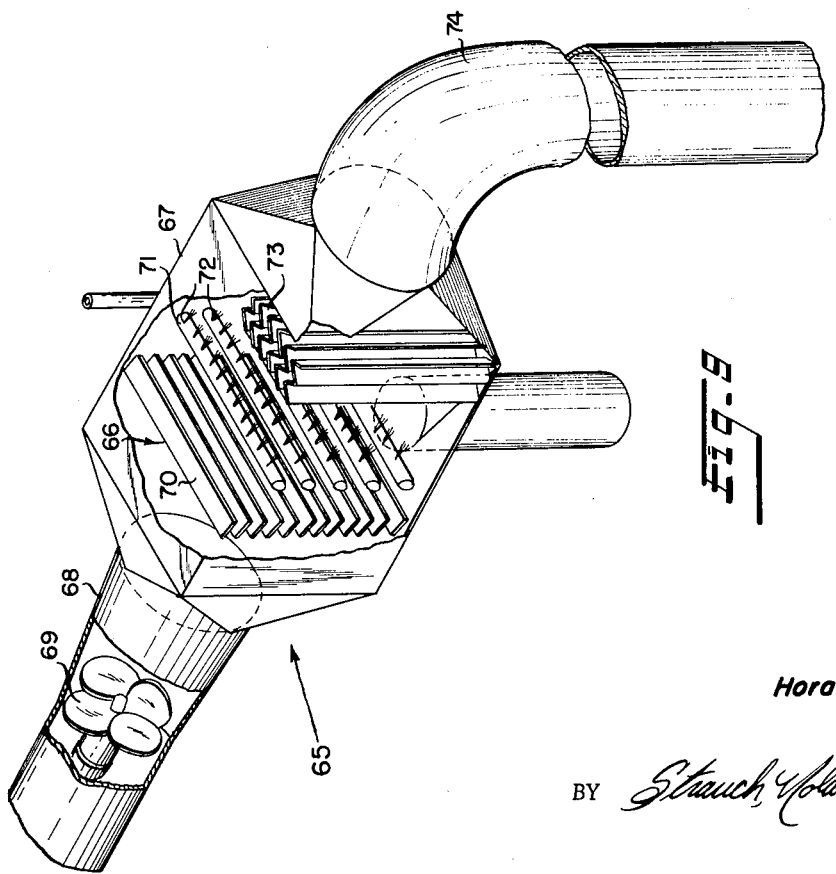
INVENTOR
*Horace L. Smith, Jr.*
BY
ATTORNEYS

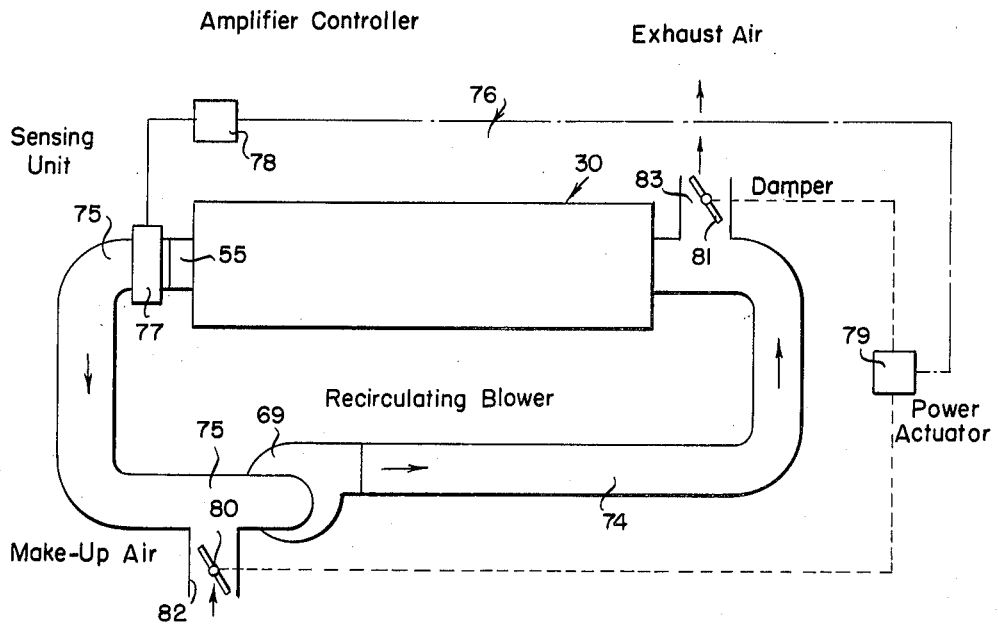
Fig. 11
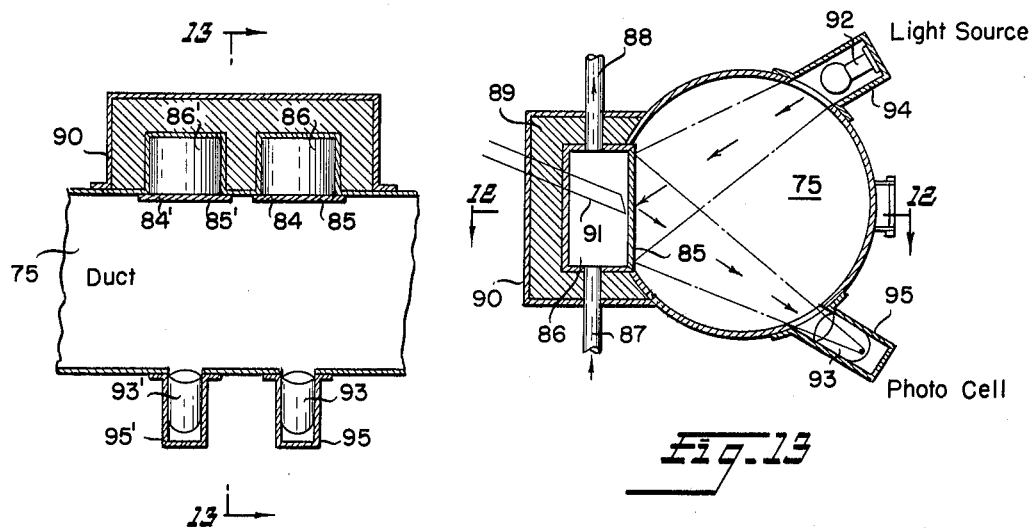
Fig. 12
Fig. 13
INVENTOR
Horace L. Smith, Jr.

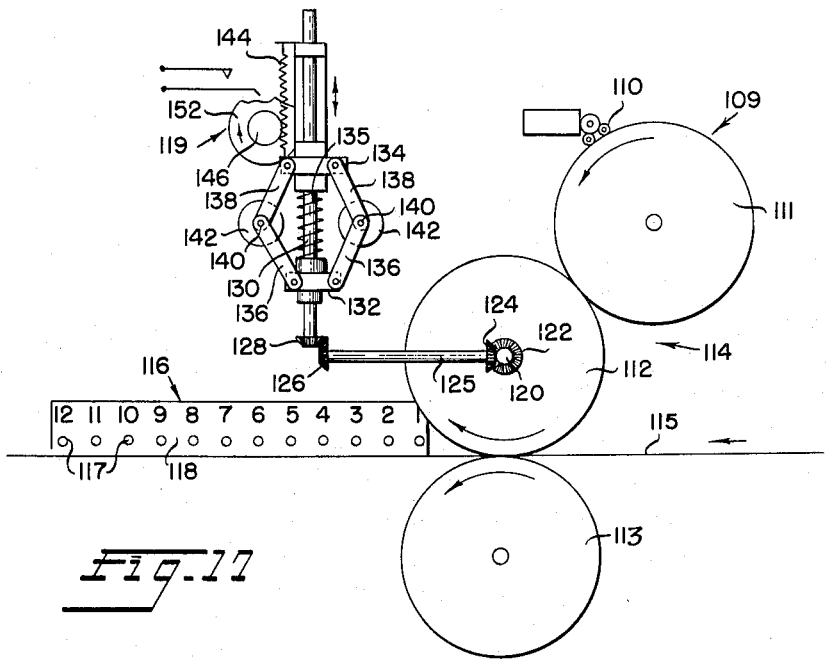
Fig. 17
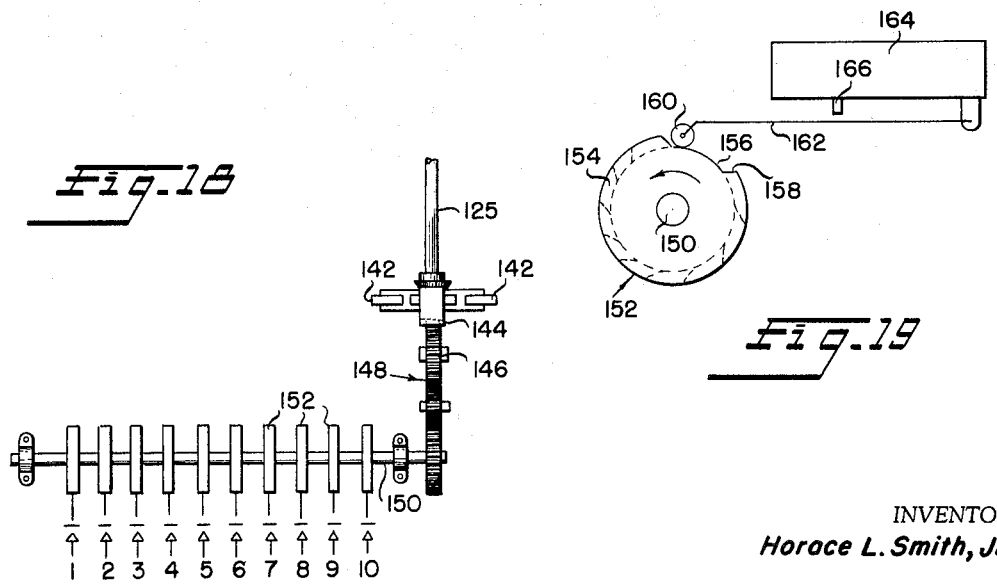
Fig. 18
Fig. 19
INVENTOR
Horace L. Smith, Jr.
BY
ATTORNEYS March 1, 1966  H. L. SMITH, JR  3,237,314
PROCESS OF DRYING ONE OR MORE MATERIALS IMPREGNATED IN OR
ON A TRAVELING CARRIER
Filed March 4, 1963  18 Sheets-Sheet 15

INVENTOR
Horace L. Smith, Jr.

BY
ATTORNEYS

March 1, 1966  H. L. SMITH, JR  3,237,314
PROCESS OF DRYING ONE OR MORE MATERIALS IMPREGNATED IN OR
ON A TRAVELING CARRIER
Filed March 4, 1963  18 Sheets-Sheet 16
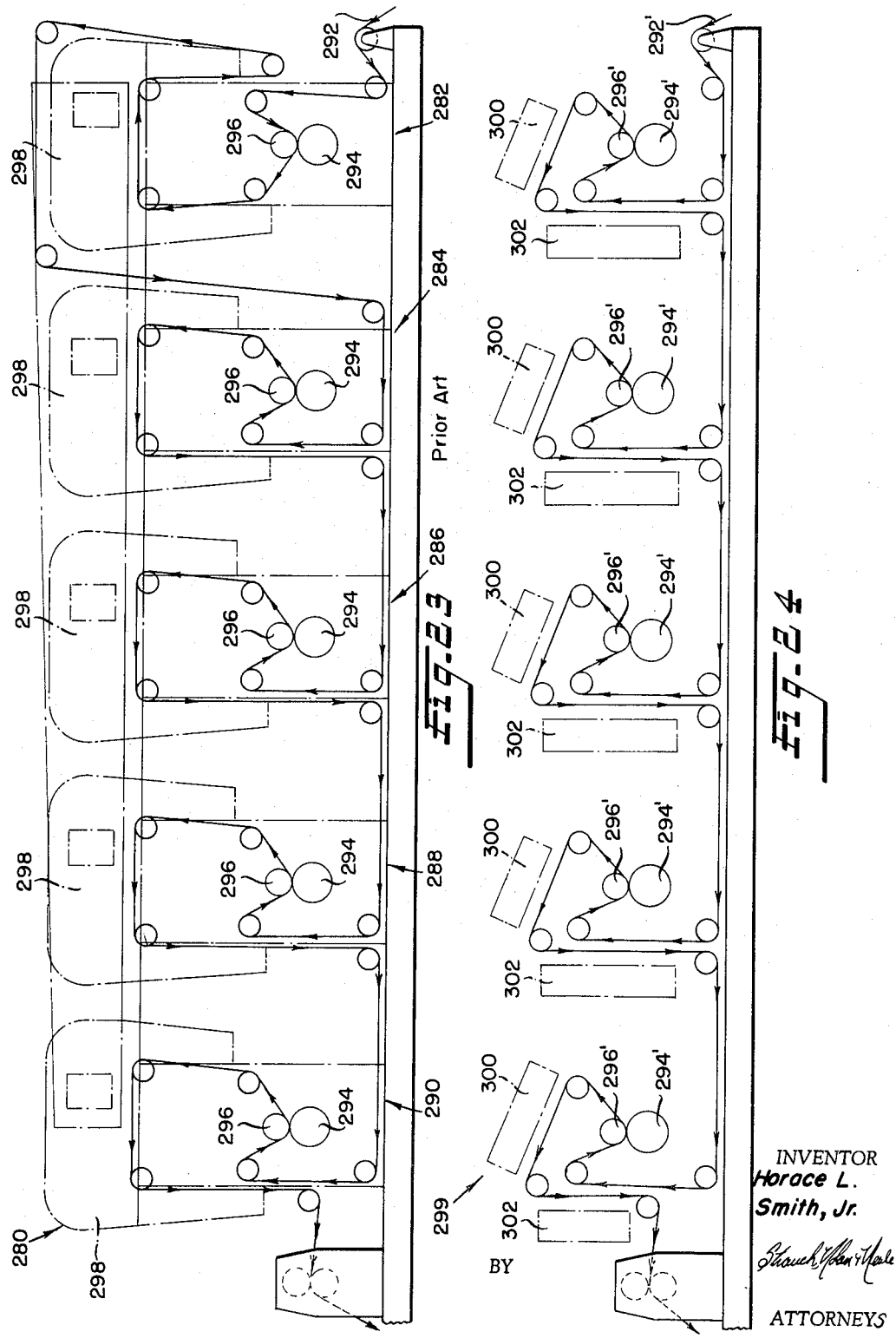
INVENTOR
Horace L.
Smith, Jr.
BY
ATTORNEYS March 1, 1966   H. L. SMITH, JR   3,237,314
PROCESS OF DRYING ONE OR MORE MATERIALS IMPREGNATED IN OR
ON A TRAVELING CARRIER
Filed March 4, 1963   18 Sheets-Sheet 17

Wave Length (Microns)

INVENTOR.
Horace L. Smith, Jr.
BY
Attorneys

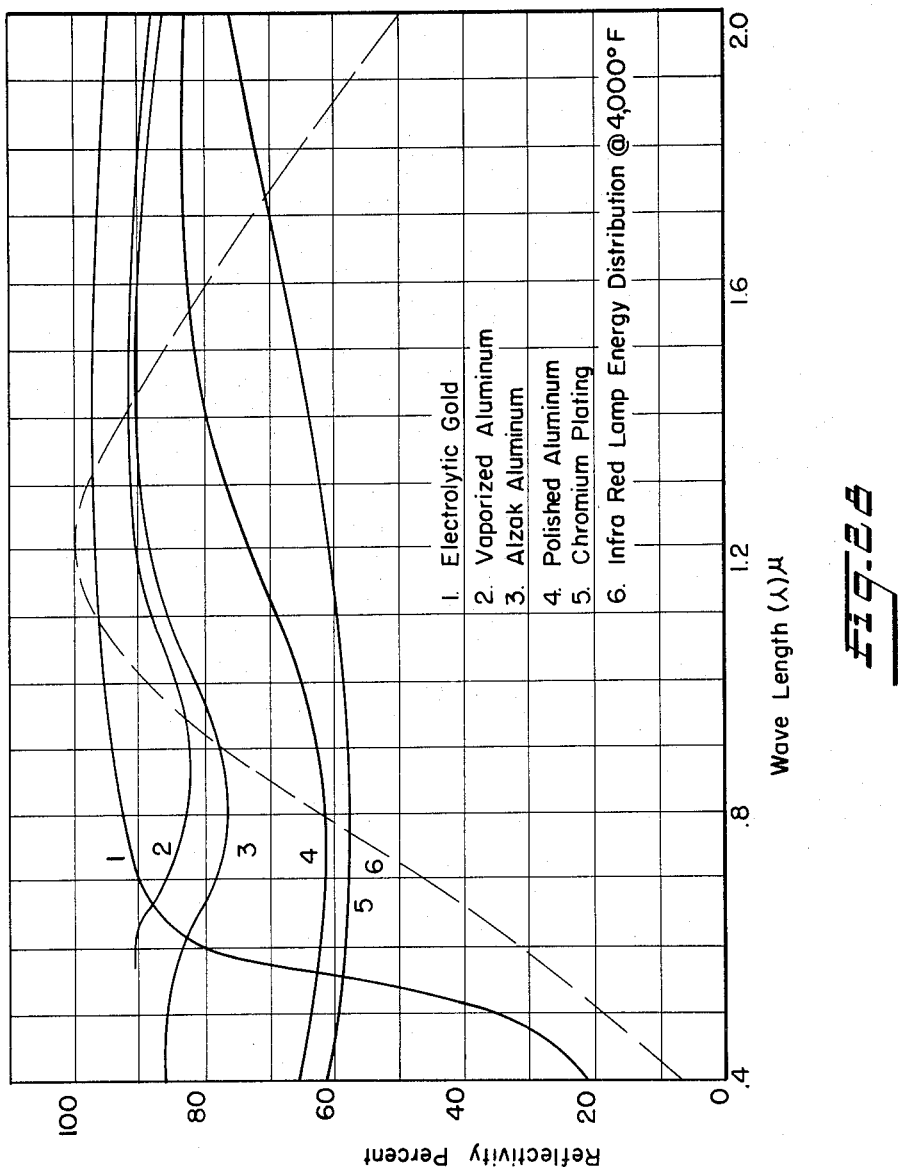

United States Patent Office 3,237,314
Patented Mar. 1, 1966

3,237,314
PROCESS OF DRYING ONE OR MORE MATERIALS IMPREGNATED IN OR ON A TRAVELING CARRIER
Horace L. Smith, Jr., Richmond, Va., assignor to Hupp Corporation, Cleveland, Ohio, a corporation of Virginia
Filed Mar. 4, 1963, Ser. No. 262,569
15 Claims. (Cl. 34—4)

The present invention relates to methods of drying rapidly moving materials containing volatile constituents. More particularly, this invention relates to the rapid drying of solutions of materials such as inks, resins and the like deposited on or impregnated into rapidly moving carriers such as webs or sheets of paper, textiles, cellophane and the like.

In recent years developments in high speed presses and printing techniques have outstripped developments in the drying art to the point that the present drying equipment used in printing installations cannot adequately dry printed areas with sufficient speed to prevent smearing or smudging when the printing presses are operated at full printing capacities. As a result, modern high speed printing presses are usually operated at speeds well below their design limits, thus substantially reducing production rates and keeping printing costs high.

Many devices have been proposed and used to accelerate the drying of ink and other materials printed on and impregnated in paper, textiles, and other carriers. For example, it has been proposed to pass the carriers over open gas flames, to blow hot air across the printed areas, and to employ steam heated radiators, electric strip heaters and gas burning infrared heaters for this purpose. At best, such methods only partially solve the problem. All fail to provide drying speeds commensurate with the printing capabilities of modern printing equipment and in general require use of cumbersome, bulky and expensive equipment.

Another disadvantage of prior drying techniques and apparatus is that the carrier may become distorted during the drying cycle. For example, in one installation a paper web printed with black ink is discharged from a gas heated furnace at temperatures in the range of 250° F. to 300° F. and passed over water cooled rolls to reduce its temperature. As the web leaves the furnace and is cooled, it absorbs moisture from the atmosphere and changes dimensions, distorting the printed material.

In contrast with prior art drying methods, that provided by the present invention permits presses to be operated at their rated capacities and, in addition, substantially eliminates the distortions of material caused by existing drying equipment. My novel drying method utilizes as a heat source short wave length radiant energy which is absorbed at different rates by inks (or other printing materials) and the materials of which the carriers are fabricated. By employing radiant energy of the proper wave length, I am able to heat the printed or coated areas at relatively high rates to evaporate the volatile materials rapidly and at the same time limit the application of heat to the uncoated portions of the carriers to a sufficiently lower rate to prevent substantial heat damage to the carriers.

The relative absorptivities of inks (or coatings) and carrier materials vary at different rates with changes in the wave length of the radiant energy. As the wave length of the radiant energy is shortened, the absorption or emissivity factors of usual carrier materials decrease rapidly so that such materials absorb proportionately less shorter wave energy than longer wave. On the other hand, both light and dark colored inks absorb relative high proportions of incident radiant energy at the longer wave lengths. Thus, by using radiant energy of proper wave lengths, maximum differences between the absorption rates of the ink and the carrier can be attained, permitting evaporation of the volatile constituents of the ink at a higher rate than has heretofore been attained.

The low rates at which certain carrier materials absorb short wave length radiant energy also decrease the quantity of heat added to the material during the drying cycle and, therefore, the amount of heat which must be removed in cooling the web, further reducing the bulkiness, space requirements, and costs of the necessary drying equipment. In addition, the evaporation of moisture from the carrier is minimized, decreasing shrinkage and other distortion and preventing the carrier from becoming brittle. As a result, a low and cheaper grade of carrier material may often be employed with a consequent reduction in cost.

In my invention the accelerated drying of printed or coated areas is accomplished by establishing a zone or zones wherein intense radiant energy is projected upon the carrier at temperatures far above those attainable in prior art devices, and far above the evaporating temperatures of the solvents used in the printing, coating, or impregnating. The radiant energy is preferably generated at peak wave lengths that produce the greatest differential absorption between printed and unprinted areas with the maximum rate of absorption in the printed areas to shorten the drying time to a minimum to thereby maximize the output of the equipment. The heating zones are of a length and provide energy of intensities permitting maximum web velocity with adequate drying. Web speed-heat output correlating controls are preferably provided to maintain the amount of heat absorbed in the printed areas substantially constant.

Since different colored inks absorb radiant energy at different rates, in multi-color printing systems such as rotogravure installations in which the different colors are printed successively, I preferably utilize adjacent each printing roll or plate a radiant energy source at an emission temperature that will result in the greatest absorption by the ink printed by that roll with the greatest difference in energy absorption between the printed and unprinted areas. In addition, as different ink and coating solvents evaporate at different rates and require different amounts of heat, I preferably adjust the amount of heat supplied at each zone in accordance with the requirement of the solvent evaporating characteristics of the ink or coating to be dried in that zone. The lightest inks, which are the least absorptive and most difficult to dry, are printed on the carrier first. Thus, these inks are at least partially dried at the station at which they are printed, and further dried at each succeeding station. As a result, the least absorptive inks are exposed to the radiant energy for the longest periods, ensuring that all inks laid on the carrier will be properly dried during the drying cycle and will provide clear impressions of each different color without smudging of the final image.

Another advantage of my invention is that substantially uniform drying of light and dark colored inks printed substantially simultaneously on a single carrier can be obtained. In this type of printing process somewhat longer wave length radiant energy is employed since, at longer wave lengths, the lighter color inks have higher absorptivity coefficients than they do at shorter wave lengths. At such wave lengths, the differential absorptivity between the light and dark colored inks is therefore minimized so they dry at substantially uniform rates. Although the differential in absorptivity between the inks and carrier may be decreased at the longer wave lengths, there will still be a sufficiently large differential that the inks can be rapidly dried without overheating the carrier.

My invention is readily adaptable to existing installations and, in conventional installations employing heated drying rolls, effectually converts the heated rolls into heat equalizing devices which initially aid in heating the ink or coating to be dried, but convey heat away from the carrier to prevent heat damage if the temperature of the carrier rises above that of the rolls.

My invention also provides for cooling the dried carrier, for increasing its moisture content, and for removing fumes and vapors from the press room or other enclosure in which the drying installation is located. This I accomplish by the use of a novel air cooling unit. The air cooling unit preferably includes an air washer to increase the humidity of the cooling air, thereby adding to its heat carrying capacity and its ability to transfer moisture to the carrier. In its preferred embodiment the air cooling unit effects a flow of air from the press room or other enclosure through the drying apparatus and into an exhaust duct system. The continuous removal of air from the enclosure ensures against the escape of fumes and vapors from the drying apparatus into the enclosure.

In some installations it may be desirable to employ the air cooling units in pairs with the units in each pair delivering air to opposite sides of the carrier. In this arrangement, the two air cooling units cooperate to position the carrier and support it free from contact with any mechanical support. As a result, there is substantially no friction on the carrier and wet ink or coating on its lower or back side will not smudge, offset, or smear.

In other installations it will be more advantageous to employ a single air cooling unit. In this circumstance I may employ a novel air cushion support to position the sheet and prevent it from billowing. As in the dual air cooling unit arrangement, the air bearing support eliminates smudging of wet ink or coating on the back side of the carrier.

The air cooling unit may also be readily arranged to draw cooling air over the electrical connections to the radiant heaters to prevent them from overheating.

I may also employ chilled rolls in conjunction with air cooling units, utilizing the air cooling units primarily to remove vapors and fumes and the chilled rolls to extract sensible heat from the carrier.

My invention also relates to improvements in the art of drying inks printed upon transparent webs. In this process, as exemplified by United States Patent No. 2,236,754 to Gurwick, a printed material is impressed on one side of a carrier of material which is substantially transparent to infrared energy. Radiant energy is then applied to the carrier to dry the printing.

The transparency to radiant energy of such carriers is dependent upon the wave length of the radiant energy and, for each such material, there is a wave length range in which available inks absorb heat at the maximum rate and in which the carrier material has the greatest transparency. In accordance with my invention I utilize this discovery to substantially improve the apparatus and method described in Gurwick's patent by supplying the radiant energy at the wave length that produces the greatest rate of absorption by the inks and to which the carrier materials are most transparent. In this way the greatest rate of energy absorption by the inks is obtained with minimum heating of the carrier.

I have also found that a significant increase in the efficiency of my improved film drying process can be obtained by locating a reflector on the side of the film opposite the radiant energy source to reflect back onto the printed areas radiant energy transmitted through the film. This results in almost all of the emitted energy being absorbed in the printed areas. This arrangement may also be advantageously employed to dry inks or coatings on papers and other carriers which are only partially transparent to the heating radiation.

In the blanket-to-blanket method of printing, the carrier is printed on and radiant heaters are preferably arranged on both sides of the carrier to obtain maximum drying. The reflectors surrounding the radiant heaters function in the manner of the reflectors discussed above, providing maximum absorption of the emitted radiant energy.

My invention is also extremely useful in drying inks or coatings on highly reflective carriers such as aluminum foil or materials with reflective, metalized surfaces. In this application of my invention radiant energy having a somewhat longer wave length is preferably employed since the absorptivity of a polished metal such as aluminum decreases as the wave length increases. By using longer wave length radiant energy, maximum differentiation between the absorptivities of the carrier and colored inks, for example, may be obtained, resulting in the most favorable ratio of drying rate to heat absorption by the carrier.

A primary object of my invention is therefore to provide novel, high speed, relatively low cost methods for drying fast moving, printed, coated, and impregnated carriers such as sheets and webs.

Another object of my invention is to provide methods for drying single and multi-color inks that will enable the attainment of printing speeds commensurate with the maximum capabilities of existing printing equipment.

A further object of my invention is to reduce printing space requirements, equipment, and operating costs and, at the same time, improve production rates and the quality of the printed product.

Another object of the present invention resides in the provision of novel drying methods which will eliminate distortion of the carrier and prevent it from becoming brittle.

A specific object of the present invention resides in the provision of novel methods of drying web or sheet type carriers employing selected wave length radiant energy to evaporate volatile constituents from materials on or impregnated in the carrier.

Another object of the present invention resides in the provision of novel methods of drying multi-colored inks by the application of radiant energy in which the different colored inks are subjected to selected wave length radiant energy for periods varying inversely to their absorptivities.

It is another object of the present invention to provide novel methods of drying materials on or impregnated into sheet and web type carriers in which volatile constituents are evaporated from said materials by applying to said carrier radiant energy of a wave length resulting in the greatest differential absorptivity between the carrier and the material.

Yet another specific object of the present invention resides in the provision of novel methods of drying materials on or impregnated into sheet and web type carriers in which radiant heatings is employed to evaporate volatile constituents from said materials and in which conductive members are maintained at a temperature below that which would damage said carrier to heat said carrier to evaporate the solvent therefrom and to act as a heat sink if the temperature of said carrier rises above said predetermined temperature to prevent heat damage to said carrier.

It is another specific object of the present invention to provide novel methods of drying materials on carriers which readily transmit radiant energy of the wave length most readily absorbed by said material.

Yet another specific object of the present invention resides in the provision of novel methods of drying materials on carriers which are highly reflective.

Additional objects and advantages and further novel features of the present invention will become apparent from the appended claims and as the ensuing detailed description and discussion proceeds in conjunction with the accompanying drawings in which:

FIGURE 2 is a chart showing the spectral distribution of energy emitted from a tungsten filament enclosed in a quartz envelope;

FIGURE 3 is a chart showing the radiant energy absorptivity, reflectivity and transmittance coefficients of 20# Cran Crest Paper for a range of wave lengths;

FIGURE 4 is a side elevation of one form of drying apparatus constructed in accordance with the principles of the present invention;

FIGURE 5 is a section through the drying apparatus of FIGURE 4, taken substantially along line 5—5 of the latter figure;

FIGURE 6 is a section through the radiant heating unit of the drying apparatus of FIGURE 4 and is taken substantially along line 6—6 of FIGURE 5;

FIGURE 7 is a section through the cooling unit of the drying apparatus of FIGURE 4 and is taken substantially along line 7—7 of FIGURE 5;

FIGURE 9 is a perspective view of an air washing unit employed in the drying apparatus of FIGURE 4;

FIGURE 11 is a schematic illustration of a control system which may be employed to automatically regulate the humidity of the drying air;

FIGURE 12 is a section through the control system sensing unit taken substantially along line 12—12 of FIGURE 13;

FIGURE 13 is a section through the sensing unit taken substantially along line 13—13 of FIGURE 12;

FIGURE 16 is a sectional view of another form of heating and drying apparatus applicable to printing machines and embodying the principles of the present invention;

FIGURE 17 is a front elevation of a control system for automatically co-ordinating the rate at which heat is applied to a web to be dried with the velocity at which the web moves through the drier;

FIGURE 18 is a top plan view of the control system of FIGURE 17;

FIGURE 19 is an elevation of a cam-actuated switch employed in the control system of FIGURE 17;

FIGURE 19 is an elevation of a cam-actuated switch employed in the control system of FIGURE 17;

FIGURE 23 is a diagrammatic view of a conventional five-color rotogravure press;

FIGURE 24 is a similar view of a conventional five-color rotogravure press modified in accordance with the principles of the present invention;

FIGURE 25 is a similar view of a five-color rotogravure press constructed in accordance with the principles of the present invention;

FIGURE 27 is a diagrammatic view of apparatus constructed in accordance with the present invention for drying materials on transparent carriers;

FIGURE 28 is a chart showing the radiant energy reflecting properties of various reflector materials.

*General*

Figure 1:
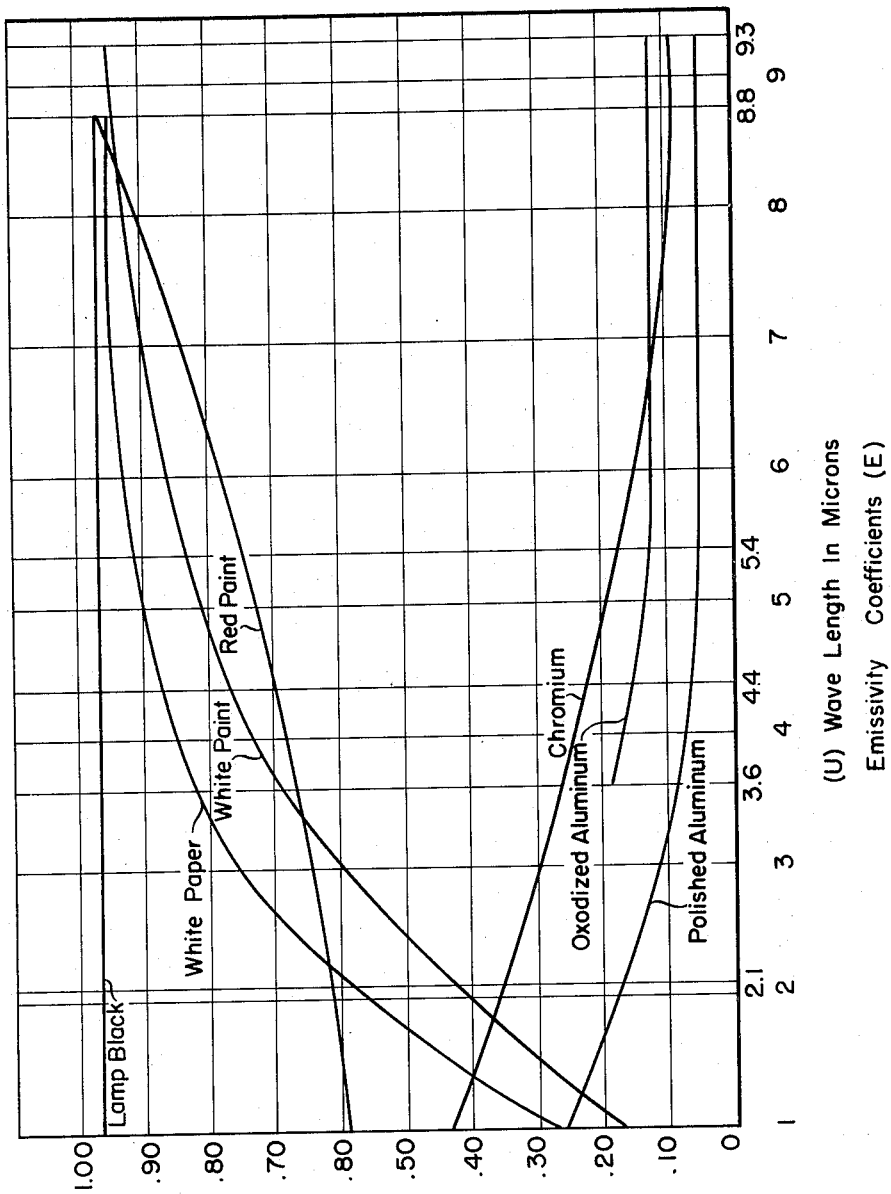
FIGURE 1 is a chart showing the variation of emissivity coefficient (ε) with changing radiant energy wave length for selected materials.

Radiant energy is electromagnetic energy similar to light and is generated by vibrations and rotations of the atoms and molecules of a material whose temperature is above absolute zero (0° K.). It moves in straight lines outwardly from the source and may be propagated in a physical medium or in a vacuum as it does not depend upon the medium for propagation.

When absorbed in a substance or medium, radiant energy will heat and elevate the temperature of the substance or medium to a degree determined by the amount of energy absorbed which, in turn, depends on the absorption characteristics of the substance or medium The absorption characteristic of a material is determined by such factors as the character of the surface upon which the incident energy falls, the color of the surface, and the emissivity coefficient of the material.

The production of heat in the absorbing substance is largely due to a phenomenon called "resonance absorption." When the frequency of the incident energy coincides with the fundamental or harmonic frequencies of vibration or rotation of the atoms or molecules of the absorbing material, energy is absorbed by the atoms or molecules of the recipient material. Since atoms and molecules of different elements and compounds have different masses and, therefore, different vibration and rotation frequencies; and, as substances are sometimes composed of many different types of atoms and molecules, different substances absorb energy at different frequencies and the spectral distribution of absorption for any given substance is not uniform. Instead, a series of peaks divided by valleys is the general appearance of any curve depicting the radiant energy absorption characteristics of a particular substance.

As a consequence of the resonance absorption phenomena, different substances absorb energy at different rates and in different amounts from a single radiating source emitting energy in a comparatively narrow band of wave lengths. I have found that such differential absorption characteristics are exhibited by inks of different colors used in multi-color printing processes, various coatings and impregnating agents, and carriers such as papers, textiles, transparent films, metals, metalized materials, and the like. Each ink and carrier material has a unique characteristic emissivity coefficient ε for a given radiant energy wave length λ. This is evident from the curves in FIGURE 1 which illustrate how emissivity coefficients vary with wave length for different materials in the near infrared region of the spectrum. For example, in the range of 1 to 9 microns wave length, the emissivity coefficient of white paper varies from 0.28 to 0.95, but the emissivity coefficient of lamp black remains substantially at 0.98.

I take advantage of the differential absorption characteristics of inks, coatings, and carrier materials to substantially speed the drying of printed, coated, and impregnated carriers. For this purpose I select radiation sources that emit radiation in frequency bands which result in the maximum differential absorptivity between the carrier and the ink, coating, or impregnating material. For example, the maximum differential absorptivity between black ink and white paper is developed at a wave length range of about 0.9 to 1.2 microns and I therefore preferably employ a source which will emit most of its energy in this range to dry black ink on white paper.

As is shown in FIGURE 2, a tungsten filament enclosed in a quartz envelope emits radiation with a spectral distribution extending from 0.4 to 4.5 microns at a temperature of 4000° F. and peaking at 1.1 microns. The major portion of the energy has wave lengths ranging from 0.6 to 2.7 microns. Most of the energy is emitted in the range producing the greatest differential heating between white paper and black ink, making such lamps particularly useful in the drying of ink as the printed paper comes from a printing press although any other radiant source emitting energy in this wave length range may equally well be employed.

In multi-color printing the different colored inks absorb radiant energy at different rates and have different absorptivity coefficients that peak in diverse portions of the infrared spectrum. To attain maximum drying efficiency in such printing operations heating lamps are selected which will emit radiant energy within narrow band widths encompassing the peaks of the emissivity coefficients of the inks. This ensures the maximum absorption of the radiant energy by the inks and also the maximum difference in absorption between the ink and the web material upon which it is applied. In this manner the different colors of inks may be dried at substantially the same rate without heat injury to the exposed unprinted web areas.

The portion of the spectrum in which a lamp of the type described above emits the major portion of its energy may be shifted by varying the voltage at which the lamp is operated. Specifically, the wave length of the emitted energy is increased by reducing the operating voltage and decreased by increasing the operating voltage.

The minimum differential between the absorption of light and dark inks is obtained at the longer wave lengths. In printing processes in which different colored inks are printed on a carrier without intermediate drying, I may take advantage of this phenomenon to equalize the drying rates of the different inks. This technique is especially useful when the carrier is a reflective material such as aluminum foil or a metalized material since, at longer wave lengths, a minimum amount of the energy is absorbed by the carrier.

To compensate for the differing drying rates of the different colored inks used in commercial multi-color printing I may also modify the inks to attain maximum speed of press operation by employing solvents of different volatilities in the different colored inks to cause them to evaporate at substantially the same rate. My invention therefore also embodies equalizing the drying rates of the different colored inks by use of solvents of selected volatilities.

The reflectivity coefficient $\rho$ and the transmittance coefficient $\tau$ also play important parts in the ability of a material to absorb radiant energy. FIGURE 3 illustrates the reaction of these coefficients and the absorption coefficient to variations in radiant energy wave length from 1.0 to 2.5 microns for 20# Crane Crest Paper. At 1.0 microns this paper has minimum absorptivity and maximum reflectivity; as the wave length increases the absorptivity increases and the reflectivity decreases. The transmittance remains substantially constant over the range of 1.0–2.5 microns, decreasing only slightly as the wave length increases. By employing a carrier having high transmittance and/or reflectivity coefficients and a substantially negligible absorption coefficient it is possible to provide minimum absorption by the carrier and maximum absorption by the ink or other material on or impregnated in the carrier. I take advantage of these phenomena to obtain maximum differential heating between light colored inks and white and light colored carriers and, therefore, maximum drying rates without heat damage to the carrier material.

*First embodiment*

Heat set inks are dried by vaporizing their volatile constituents, removing the evolved constituents to prevent them from returning to the ink, and cooling the ink to set it. The drying and cooling apparatus 30 shown in FIGURE 4 is especially useful in the drying of heat set inks although it is by no means limited to this one application.

Drying and cooling apparatus 30 is particularly adapted to dry and cool carriers coated or imprinted on both sides as in the blanket-to-blanket method of printing, but may also advantageously be employed when the carrier is imprinted on only one side to increase the drying rate. Drier 30 includes two identical drying-cooling ink setting units 31 and 32 disposed in spaced, superimposed relationship and providing a horizontally extending gap or channel 33 through which the carrier 34 travels in the direction indicated by the arrow in FIGURE 4 as it leaves the printing press or coating apparatus (not shown). Each of the two identical drying-cooling-ink setting units 31 and 32 includes a radiant heating unit 35 and a cooling unit 36 adjacent which the carrier pass. In heating units 35 the carrier absorbs radiant heat from banks of lamps at a wave length that results in substantially more heat being absorbed in the inked areas than in the non-inked areas. After passing through the heating unit, the carrier passes through the cooling units where the web or sheet is cooled and moisture is added to replace that evaporated in the heating units.

Referring now to FIGURES 4–6, each of the identical radiant heating units 35 includes a plurality (12 in the illustrated embodiment) of tungsten filament, quartz envelope lamps 37 disposed in spaced, parallel, relationship; a reflector 38 disposed adjacent and parallel to the row of lamps; and a sheet metal housing 40 forming a plenum chamber 41.

Lamps 37 are designed to operate at temperatures ranging from about 2000° F. to 5000° F. to produce radiant energy having a wave length ranging from $2.0\mu$ to $0.93\mu$, but may be operated at higher and lower temperatures if desired to produce radiant energy of other wave lengths and may be replaced by any other emitter which will produce radiant energy in the desired range of wave lengths. The operating temperature is preferably regulated td cause emission of radiant energy adapted to produce the maximum difference in absorption between the ink and the carrier. The ability of black ink to absorb radiant energy changes very little with changes in the wave length of the radiant energy as the absorption coefficient remains constant at about 0.98 regardless of the wave length. However, the absorption coefficients of typical carrier materials decrease rapidly as the wave length of the incident radiant energy is decreased, reaching a minimum in the region of $1.0\mu$ (see FIGURE 3, for example). Because of this, it is possible to employ radiant energy of high intensity to secure rapid heating and drying of the printed areas without overheating unprinted areas of the carrier.

Because of wet bulb depression, the temperature of the ink will be lower than the temperature of the carrier and will not rise until all of the volatile materials are evaporated. By adjusting the intensity and/or the rate of supply of the radiant energy and the period the printed areas remain exposed to it, the total amount of heat that the printed areas receive may be adjusted to effect the proper degree of dryness without heat damage to the carrier.

In some printing processes, it is necessary to dry two different color inks simultaneously. For such applications radiant energy having a compromise wave length is selected to permit maximum absorption by the least absorptive inks without heat damage to the portions of the carrier over which the more absorptive inks extend. For example if yellow and black inks are to be simultaneously dried, radiant energy having a compromise wave length on the order of $2–3\mu$ is preferably employed.

As best shown in FIGURE 6, reflector 38 spans transversely oriented lamps 37 and, at its opposite edges, is bent at right angles forming the side walls 42 of the hollow, rectangularly sectional plenum chamber 41 which is closed by a sheet metal bottom wall 43, a perforated end wall 44, and an apertured end wall 45. Mounted in plenum 41 are brackets 46 to which lamp supporting members 47 are attached. As is shown in FIGURE 6, lamp supporting members 47 are connected to the ends of lamps 37 and support them in parallel spaced relation to reflector 38.

The ends of lamps 37 are surrounded by sheet metal housings 48 provided with slots 49 (see FIGURE 6) through which lamps 37 extend. Referring now to FIGURE 4, a flow of cooling air is induced through perforations 50 in housing end wall 44 into plenum chamber 41. The air flows through the plenum chamber and is exhausted into the exhaust system of the associated cooling unit 36 through three tubes 51 connected between the plenum chamber and the cooling unit (see FIGURE 7). The flow of cooling air through plenum 41 cools the rear surface of reflector 38, preventing it from being overheated by the high intensity radiant energy emitted from lamps 37. The flow of air may be controlled by dampers (not shown) arranged over apertures 50.

A flow of cooling air is also induced through the slots 49 in housings 48. As is shown by the arrows in FIGURE 4, this air flows around the end terminals of lamps 37 and then through apertures 52 in reflector 38 (see FIGURE 5) into plenum chamber 41. The flow of cooling air around the lamp terminals prevents these connections from overheating and shorting out. To minimize the heat loss, the lamp connections are cooled the minimum amount necessary to prevent overheating. In operation, these connections are preferably maintained at a temperature in the range of 400–800° F.

If desired, for a particular application, a separate exhaust system may be provided for the heating units. Such a system may include, in general, an exhaust fan and an exhaust duct arrangement for conveying the evolved vapors from tubes 51 to the point of discharge.

Figure 8:
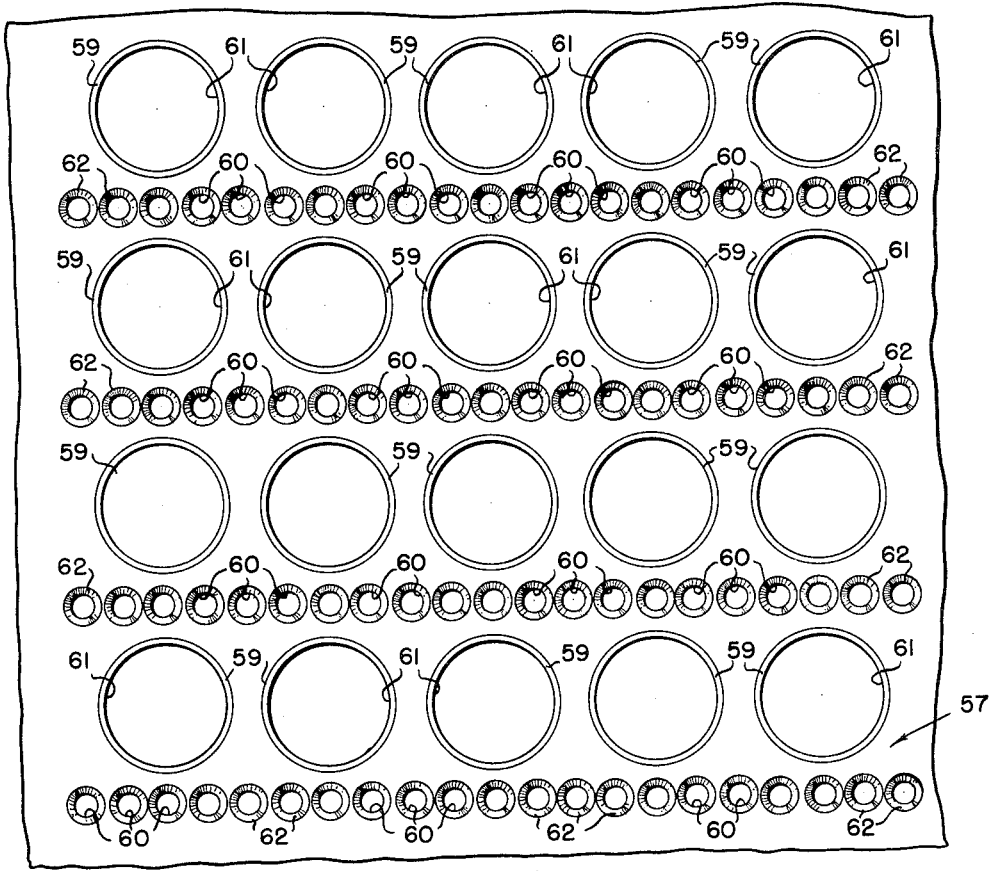
FIGURE 8 is a fragmentary plan view of a nozzle plate employed in the cooling unit of FIGURE 7.

Turning now to FIGURES 7 and 8, each of the identical cooling units 36 includes a sheet metal housing 53 provided with in inlet duct 54 and an outlet duct 55 (see FIGURE 5). Disposed within housing 53 is a nozzle assembly 56 fabricated from a nozzle plate 57 mounted parallel to and closely adjacent carrier 34, an apertured plate 58 parallel to and spaced from nozzle plate 57, and exhaust tubes 59 extending through and between plates 57 and 58.

Referring next specifically to FIGURE 8, alternating rows of small diameter apertures 60 and large diameter apertures 61 are drilled in nozzle plate 57. As is shown in FIGURE 7, the end portions 62 of the small diameter apertures 60 remote from the carrier 34 are chamfered.

Apertured plate 58 is provided with rows of large diameter apertures 63 so located that, when plates 57 and 58 are superimposed, the apertures 63 in the plate 58 lie directly above the apertures 61 in nozzle plate 57.

Referring next to FIGURES 5 and 7, cooling air flows from inlet duct 54 into housing 53 and through the small diameter apertures 60 (which act as nozzles) at high velocity against the surface of carrier 34. After impinging upon the surface of carrier 34, cooling it and sweeping away volatiles adjacent its surface, the cooling air flows through exhaust tubes 59 and the portion of the chamber 64 remote from plate 58 into exhaust duct 55. The chamfered inlet ends 62 of nozzles 60 prevent the formation of vena contract as in the nozzles permitting the cooling air to flow through nozzles 60 at velocities ranging from 6–10,000 feet per minute and through exhaust tube 59 at a velocity on the order of 2000 feet per minute. At these velocities the air forces carrier 34 away from nozzle plate 57 so that, by the co-operation of the two cooling units 36, the carrier 34 is supported on a curtain of air as it travels through drier 30, preventing the coating or printing on the carrier from being smudged or smeared.

In one drier of this type, nozzles 60 have a diameter of 3/16 inch and are located on 3/8 inch centers. The larger apertures 61 and 63 have 1 1/8 inch diameter as do exhaust tubes 59.

Figure 26:
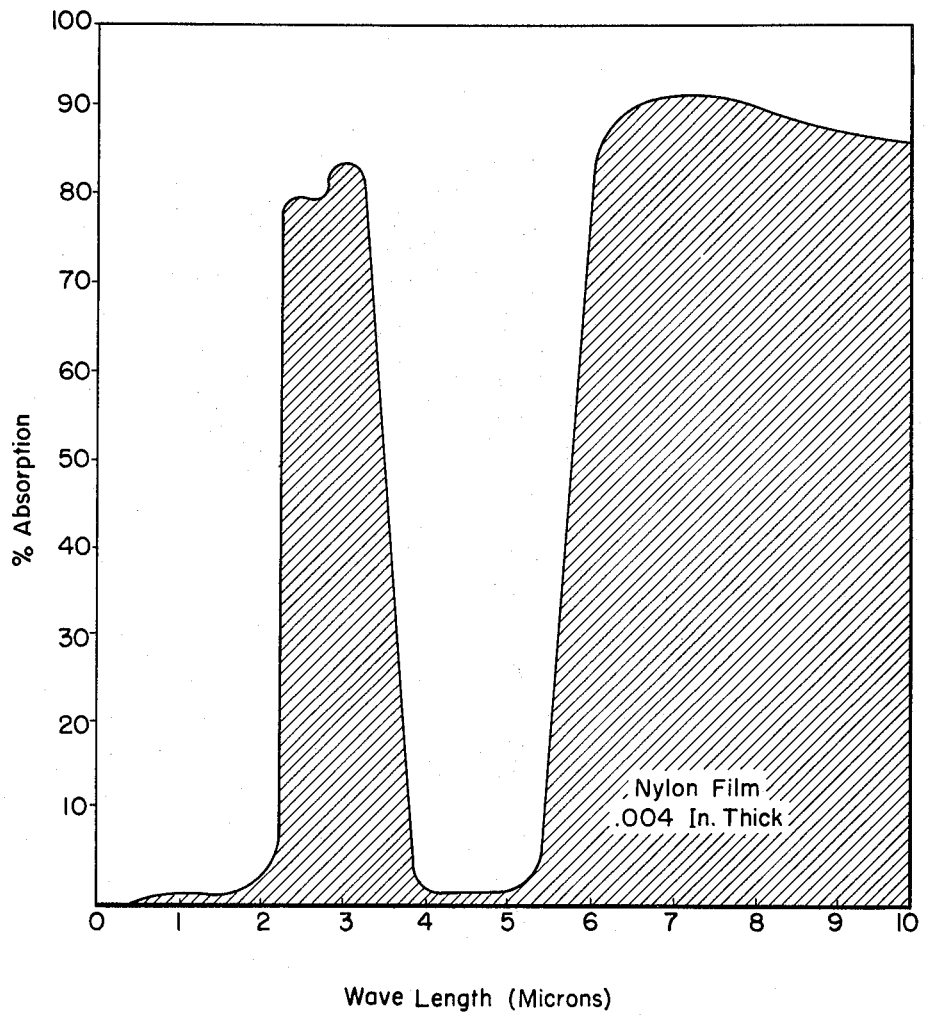
FIGURE 26 is a chart showing the radiant energy transmitting properties of nylon film.

One of the advantages of the cooling unit illustrated in FIGURE 26 is that the nozzle assembly 56 may be readily and inexpensively assembled. The large apertures 63 in plate 58 and 61 in nozzle plate 57 are drilled slightly larger than the outside diameter of exhaust tubes 59, which are preferably formed of a ductile, thin-walled material. Apertures 63 and 61 are then tapped to provide internal screw threads. Following the threading operation, plate 58 is laid on top of plate 57 and tubes 59 are dropped through the plates until their lower ends are flush with the surface of plate 57. The tubes are then expanded into the threads formed in apertures 61 by a conventional tube roller or the like, securely fastening the lower ends of the tubes to nozzle plate 57. Nozzle plate 58 is then slid along the tubes until its surface is flush with their oposite ends. The opposite tube ends are then expanded into the threads provided in apertures 63.

During the drying process the carrier may be heated to a temperature sufficiently high to drive moisture from it, leaving it dry and brittle. It is therefore desirable in some installations to replace the moisture driven from the carrier. The addition of moisture to carrier 34 is effected in units 36 by increasing the humidity of the cooling air delivered to the cooling units. A further advantage gained by employing moist air is that the heat carrying capacity of the air is increased by increasing its humidity. To add moisture to the air, the air washing unit 65 illustrated in FIGURE 9 may be employed. Turning now to this figure, air washing unit 65 comprises an air washer 66 disposed in a casing 67. Casing 67 is provided with an inlet conduit 68 in which a blower 69 is located to draw ambient air from the exterior of the casing and force it through air washer 66 and the air cooling units 36.

A grating 70 is disposed in casing 67 adjacent the inlet end of the inlet conduit 68 to direct the air in parallel paths through the casing. Adjacent grating 70 is a tier of parallel pipes 71 provided with spaced nozzles 72 which inject a misty spray into the airstream to cool and add moisture to the air. The cool, clean, humid air is directed against exit grating 73 as it leaves the washer to remove excess suspended moisture from the air. A conduit 74 conducts the air from air washer 66 to the inlet ducts 54 of drier units 36.

In one representative dryer of this type, air is taken from the press room at about 80° F. and at a relative humidity on the order of 50%. In washer 66 the air is cooled to 66° F. and the relative humidity is increased to 100%. The moisture content of the air is raised from 0.011 to 0.014 pound of water per pound of air, substantially increasing its heat carrying capacity. Air conditioned as discussed above has been found to be highly effective in removing evolved volatiles from adjacent the carrier and in cooling and restoring the moisture content of the carrier.

In some applications it may be desirable to precisely control the moisture content of the dried carried material. I have found that this can readily be done by controlilng the humidity of the cooling air. Referring now to FIGURE 11, a return duct 75 may be connected between the outlet end of exhaust conduit 55 and blower 69 to permit recirculation of the spent cooling air in installations in which the humidity of the cooling air is to be regulated. By varying the proportions of spent recirculated cooling air (which has a relative humidity approaching 100%), and relatively drier make-up air induced into the closed circulating system, the humidity of the cooling air can be closely controlled. The proportioning of the cooling air may be accomplished by manually adjustable valves or by the control system 76 illustrated in FIGURES 11–13 which will automatically maintain the humidity of the heated air discharged into cooling units 36 constant. Automatic humidity control system 76 includes a sensing unit 77, an amplifier-controller 78, and a power actuator 79. Sensing unit 77, which is located in duct 75, generates a signal indicative of the specific humidity of the air flowing through the return duct which it transmits to amplifier-controller 78 (which may be, for example, a Model GP107 manufactured by General Electric Co.). Amplifier-controller 78 amplifies the signal and transmits it to power actuator 79 which may be a conventional, low speed, reversible D.C. motor. Power actuator 79 is operatively connected to and adjusts the valves 80 and 81 in make-up air duct 82 and vent air duct 83, respectively, to continuously vary the proportions of recirculated and fresh air and thereby maintain the humidity of the air impinging upon the web of material 34 moving through the drier constant.

Figure 10:
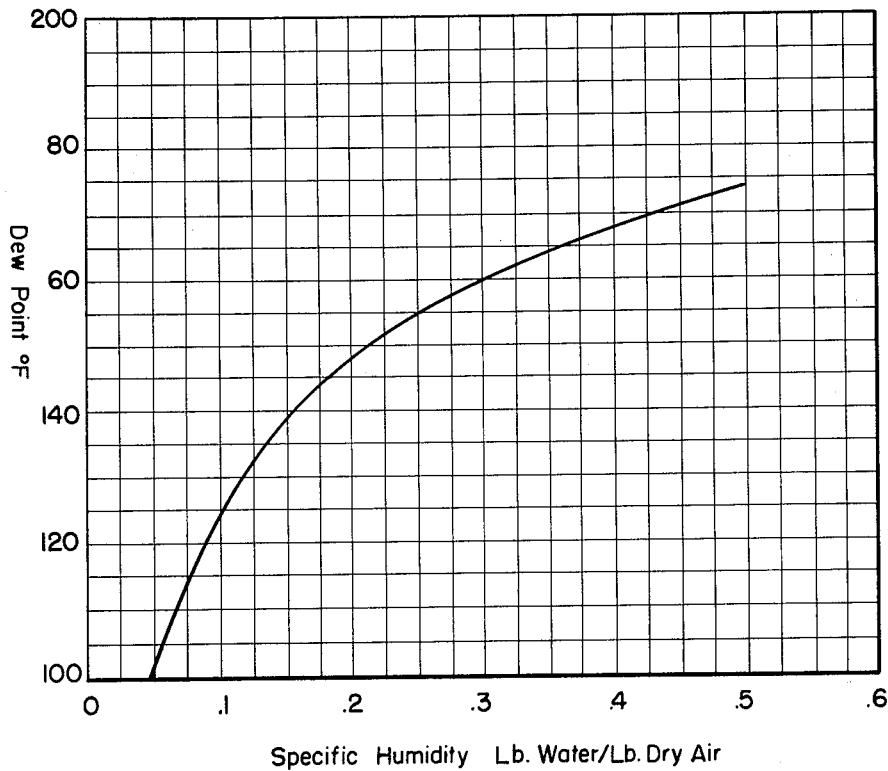
FIGURE 10 is a graphical illustration of the relation between dewpoint and relative humidity.

Referring now to FIGURE 10, sensing unit 77 takes advantage of the well known physical facts that (1) as the specific humidity of a body of air increases, its dew-point also increases; and (2) if a body of air contacts a surface having a temperature lower than the dewpoint of the air, the moisture in the air will condense on the cooler surface. Thus, with reference to FIGURE 10, if the specific humidity of a body of air is 0.4 pound of water per pound of dry air, the dew-point of the air is 168° F. and the moisture in the body of air will condense on a surface having a temperature lower than 168° F. Similarly, if the specific humidity of the air is 0.3 pound of water per pound of dry air, the dewpoint of the air is 160° F., and moisture will condense out of the air onto a surface having a temperature lower than 160° F.

Referring next to FIGURES 12 and 13, sensing unit 77 includes a copper plate 84 mounted in duct 75 and having a highly polished, chrome plated surface 85 facing the interior of the duct. Plate 84 is maintained at a constant temperature as by circulating water or other constant temperature liquid through a chamber 86 into heat transfer relationship with the rear or outer side of plate 84. Chamber 86 is provided with an inlet line 87 and an outlet line 88 and is surrounded by insulation indicated generally by reference character 89. The insulation is retained in place by a casing 90 attached to duct 75 in any desired manner. A thermocouple 91 may be mounted in contact with the outer side of plate 84 to provide a continuous indication of its temperature. The liquid circulated through chamber 86 may be heated in any desired manner as, for example, by the apparatus shown in United States Patent No. 1,960,658 issued May 29, 1934, to K. P. Brace for "Dew Point Control Device."

The temperature of plate 84 is selected so that, if the specific humidity of the air flowing through return duct 75 is above the desired level, the dewpoint of the flowing air will be above the temperature at which plate 84 is maintained and the moisture in the flowing air will condense on and fog the highly polished chrome plated surface 85 of the plate. For example, if it is desired to maintain the specific humidity of the air flowing through return duct 75 at 0.3 pound of water per pounds of dry air, plate 84 will be maintained at a temperature of 160° F. If the specific humidity of the air flowing through the return duct rises above 0.3 pound of water per pound of dry air, the dewpoint of the air will rise about 160° F., and the moisture in the air will condense out on the polished surface 85 of plate 84.

With continued reference to FIGURES 12 and 13, the presence of fog or condensate on plate 84 is detected by reflecting a beam of light emitted by a lamp 92 from the chrome plated surface 85 of plate 84 into a photoelectric cell 93. Thus, if the specific humidity of the air flowing through duct 75 rises above the desired level, condensate will form on the surface 85 of plate 84 and the intensity of the light reaching photoelectric cell 93 will be substantially less than when no condensate is present. Therefore, the intensity of the current generated by photoelectric cell 93 will be diminished, producing a signal which, as explained above, is amplified and transmitted to power actuator 79. In the above circumstance, power actuator 79 opens valve 81 in vent duct 83 and valve 80 in make-up air duct 82 to replace part of the moisture laden recirculated air with fresher, drier make-up air. Lamp 92 and photoelectric cell 93 are mounted in appropriate housings 94 and 95 attached in any desired manner to duct 75.

In the preferred embodiment illustrated in FIGURES 12 and 13, the fog forming and detecting system including plate 84, the apparatus provided for keeping plate 84 at a constant temperature, lamp 92, and photoelectric cell 93 is duplicated, the components of the second system being indicated by reference characters identical to those employed in conjunction with the first, but primed.

The two systems operate in the same manner except that, assuming that it is desired to maintain the specific humidity of the air flowing through return duct 75 at 0.3 pound of water per pound of dry air, plate 84 will be maintained, for example, at a temperature of 159° F. and plate 84' at a temperature of 161° F. In this case, if the specific humidity of the air flowing through duct 75 falls more than slightly below 0.3 pound of water per pound of dry air, the polished surface of both plates 84 and 84' will be unfogged or clear. If the specific humidity of the air is or is close to 0.3 pound of water per pound of dry air, the polished surface of plate 84 will be fogged, but the surface of plate 84' will be unfogged. If the specific humidity of the air increases to more than slightly above 0.3 pound of water per pound of dry air, the surfaces of both plates 84 and plate 84' will be fogged. By combining the output voltages of the two photoelectric cells 93 and 93', a continuous variable signal can be generated which will detect minute increases and decreases in the specific humidity of the air flowing through duct 75. Thus, by employing a dual system, the specific humidity of the air can be maintained at the desired level within very close tolerances.

This embodiment of the invention is particularly applicable to those installations where multi-color inks are printed upon the carrier and where radiant energy at longer wave lengths is used to achieve maximum absorption by the yellow ink (which does not readily absorb the radiant energy of shorter wave lengths). In these installations the high rate of heat transfer can still be obtained by use of this embodiment of the invention even though there is but a small difference between the absorption characteristics of the yellow ink and the carrier materials since overheating of the carrier will be prevented by the cooling air.

The foregoing embodiment of my invention has been described principally by relating it to the drying of printed matter. It is to be understood, however, that this is but one of many applications for which this apparatus is suited and that I do not intend to limit myself to this one exemplary application of my novel drying apparatus. This apparatus may be advantageously employed, for example, to dry coatings, to cure resins impregnated in fabrics, and for the drying or heat treating of innumerable other materials on or impregnated in a wide variety of carriers.

*Second embodiment*

Figure 14:
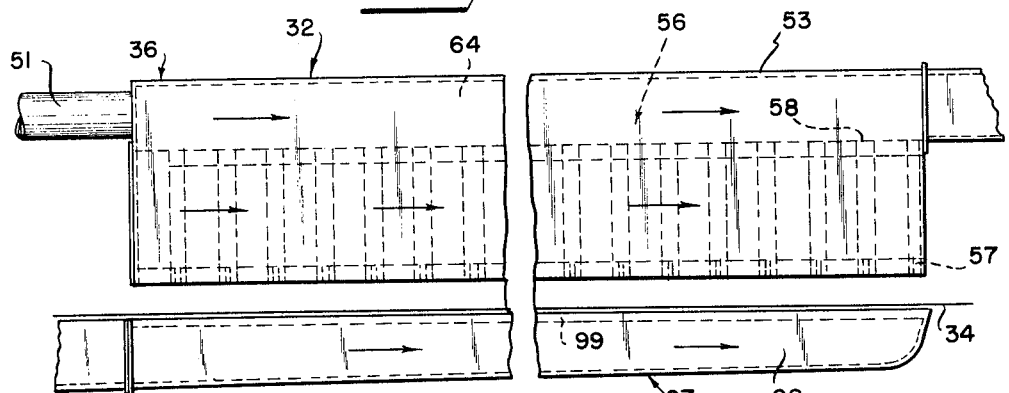
FIGURE 14 is an elevation of a modified form of cooling unit which may be employed in the drying apparatus of FIGURE 4.
Figure 15:
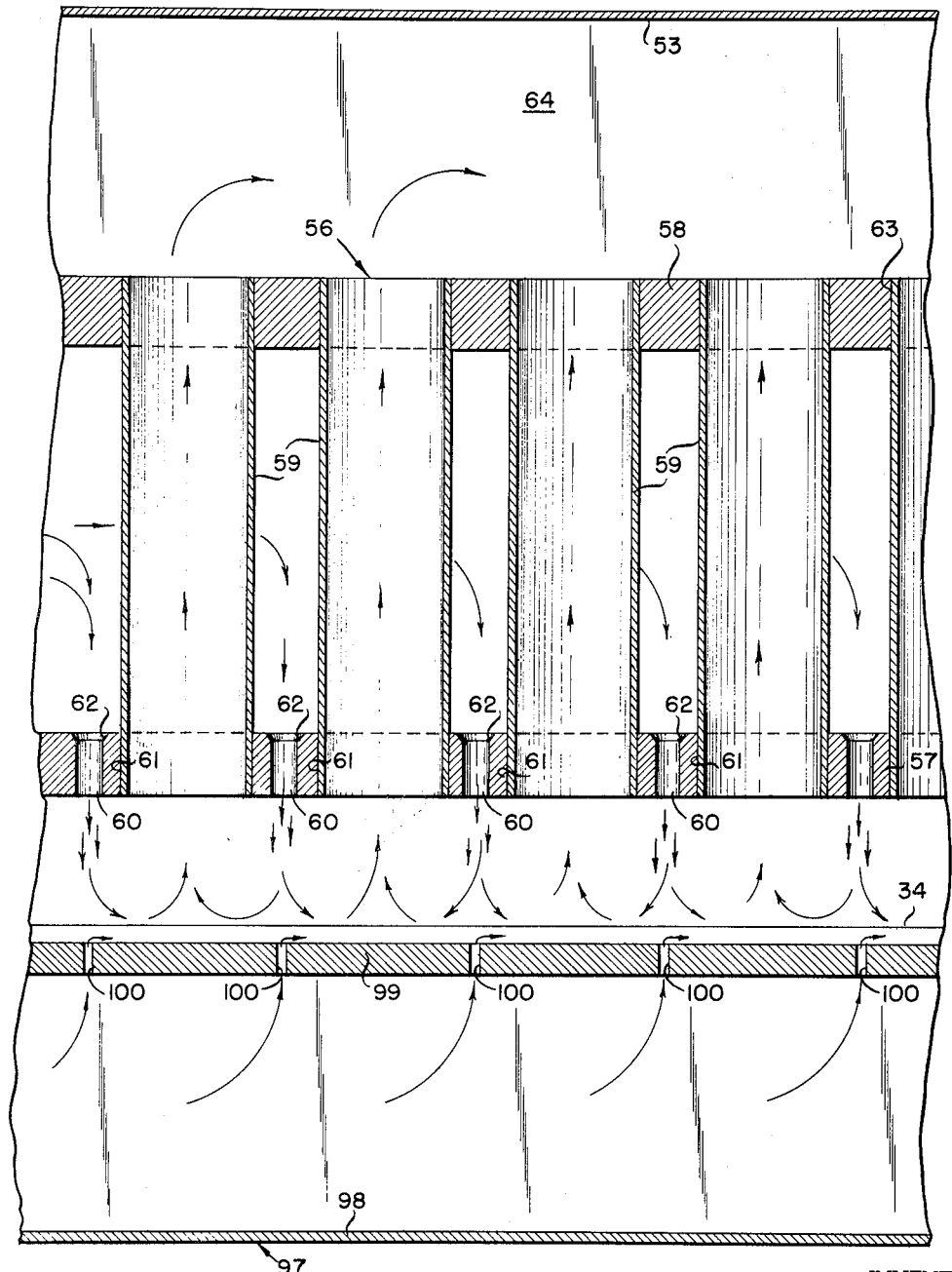
FIGURE 15 is a portion of the modified cooling unit, partly in section and to an enlarged scale.

The drier-cooler unit 96 illsutrated in FIGURES 14 and 15 is, in some respects, similar to the drier 30 illustrated in FIGURES 4 and 5; and, to the extent that these two driers are alike, identical reference characters have been employed to designate like components.

Drier 96 differs from drier 30 mainly in that it employs but a single heating radiant heating unit 35 and a single cooling unit 36. As is best shown in FIGURE 14, the radiant heating and cooling units are disposed above the horizontally moving carrier 34 which is supported on a thin film of air by an air cushion 97 as it passes through the drier. Air cushion 97 is of extremely simple construction, consisting of a chamber-forming housing 98 and a horizontally disposed nozzle plate 99 substantially equal in length and width to the combined radiant heating unit 35 and cooling unit 36. Apertures 100 having a diameter on the order of 1/32–1/16 inch are drilled in nozzle plate 99 on about 1″ centers. Any convenient source of compressed air is employed to force air through apertures 100 at a pressure of about 0.5 pound per square inch gauge, providing a film of air to support carrier 34 above the upper surface of nozzle plate 99 and prevent it from smudging or smearing.

In both this embodiment and the embodiment of FIGURE 4, on the order of 20% more air is exhausted through duct 55 than is supplied through duct 54. This insures that no volatiles escape from the cooling unit into the press room. As in the embodiment of FIGURE 4, an air washer may be employed to increase the humidity of the air supplied to the cooling units to increase its heat carrying capacity and to restore moisture to the carrier; and the automatic humidity control system of FIGURES 10–13 may be employed to regulate the humidity of the cooling air, if desired.

*Third embodiment*

FIGURE 16 illustrates yet another novel aspect of my invention. In drying coated, printed, and impregnated carriers two often conflicting goals exist. First, it is desirable to heat the carrier to a temperature above the boiling point of the solvent in the material on or impregnated in the carrier as rapidly as possible to maximize the drying rate. At the same time it is necessary to maintain the temperature of the carrier below the temperature at which it would be heat damaged. The drier 101 illustrated in FIGURE 16 is especially adapted to achieve both of these goals effectively and without the necessity of employing a complex, expensive control system.

Drier 101 includes a large diameter, hollow drum or roll 102 supported on a rotatably mounted shaft 103. Drying roll 102 is maintained at a uniform temperature by circulating steam through its hollow interior at a temperature above the boiling point of the solvent to be evolved, but below the temperature at which the carrier would be heat damaged.

As long as the temperature of the carrier is below the temperature of the drum, the drum adds heat to the carrier, rapidly raising its temperature above the boiling point of the solvent. If the temperature of the carrier rises above the temperature of the drum, the drum acts as a heat sink, conducting heat away from the carrier and protecting it from heat damage.

The details of the drum construction and the manner in which the heated liquid is supplied to it form no part of the present invention and therefore are not deemed to require extended discussion.

Drier 101 also includes a radiant heater 104 spaced from drum 102 a distance sufficient to permit carrier 105 to pass beneath the radiant heater without interference. Radiant heater 104 includes an annular casing 106 shaped to fit the contour of drum 102. Disposed within casing 106 are a curved row of lamps 107 and a reflector 108 arranged to reflect energy emitted from lamps 107 radially inwardly of the drum against carrier 105.

As in the embodiments discussed above, the lamps may have tungsten filaments and cylindrical quartz envelopes. Lamps 107 are substantially parallel to the axis of drum 102 and have a length sufficient to span the width of the drum. The lamps are preferably operated at the temperature at which they emit radiant energy of the wave length producing maximum differential absorption between the carrier and the material on or impregnated in the carrier.

*Radiant heater control system*

In each of the embodiments of my invention described above, it is desirable to maintain the amount of radiant energy absorbed by the carrier substantially constant. To achieve this, provision must be made for varying the rate at which radiant energy is emitted by the radiant heaters since the presses and coating and impregnating apparatus with which my novel driers are adapted to be employed do not always run at uniform speeds. One manner in which this can be accomplished is by reducing the number of energized lamps as the speed of the carrier through the drier decreases and, conversely, increasing the number of energized lamps as the speed of the carrier increases.

For this purpose a governor may be operatively connected to the printing press or coating or impregnating apparatus, preferably to that printing, or coating, or impregnating station immediately preceding the drier so that the governor will closely reflect the speed of the carrier as it enters the drier.

Figure 21:
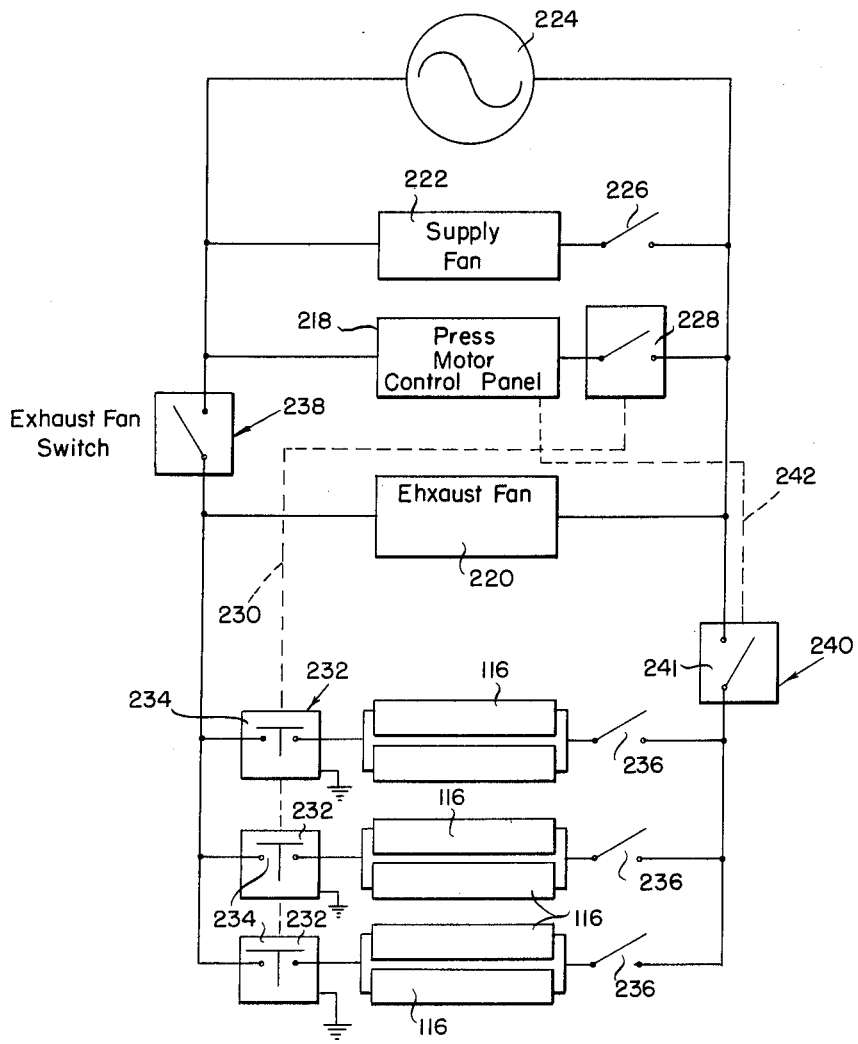
FIGURE 21 is a schematic diagram of a control system which may be employed with the press of FIGURE 17.

Turning now to FIGURES 17–19, printing press 109 includes inking rollers indicated generally by reference character 110, a plate cylinder 111, a blanket cylinder 112, and an impression cylinder 113 of conventional construction which, together, constitute a printing station 114. The carrier 115 passes between impression cylinder 113 and blanket cylinder 112 which transfers the ink to the carrier to form the desired impression. From printing station 114 the imprinted carrier passes beneath heater bank 116 (only one heater bank is shown in FIGURE 17 but plural banks may be employed and may be arranged to heat opposite sides of the carrier as shown in FIGURE 21) which includes a plurality of lamps 117 of the type described above surrounded by a reflector 118. It is to be understood that heater bank 116 is diagrammatically shown in FIGURE 17 and, in actual practice, would be incorporated in a drier such as those discussed above, for example.

As the carrier passes beneath heater bank 116, the amount of radiant energy directed onto it is maintained substantially uniform by increasing or decreasing the number of operative lamps 117 in proportion to the speed of the carrier. Appropriate lamps are energized by the control system shown in FIGURES 17–20 and indicated generally by reference character 119. Referring now to these figures, the input to control system 119 is the shaft 120 of blanket cylinder 112 which has a bevel gear 122 mounted on its outer end. Bevel gear 122 meshes with a bevel gear 124 fixed to one end of a horizontally extending governor drive shaft 125. A bevel gear 126, fixed to the opposite end of governor drive shaft 125, meshes with a bevel gear 128 fixed to the lower end of a vertical governor shaft 130.

Journalled on shaft 130 are a fixed collar 132 and a movable or slidable collar 134. Surrounding shaft 130 and extending between collars 132 and 134 is a governor biasing spring 135 which urges movable collar 134 upwardly away from fixed collar 132. Pivotally connected to collars 132 and 134 are two pairs of links 136 and 138 joined by pivot pins 140. Pivot pins 140 carry weighted members 142 which moves away from shaft 130 as the latter rotates, decreasing the angle between the links 136 and 138 in each link pair, thereby moving slidable collar 134 toward fixed collar 132 against the bias of spring 135.

Collar 134 is connected to and moves a rack 144 meshed with a pinion 146 which, through a train of spur gears indicated generally by reference character 148, rotates a cam shaft 150 through angular increments proportional to the movement of collar 134. Mounted in spaced relation on cam shaft 150 are a plurality of cams $152_{1-10}$. Each cam 152 has upper and lower circular lands 154 and 156 joined by sloping surfaces 158 (see FIGURE 19) with the lands so oriented that the lower lands of adjacent cams successively pass through a line parallel to the longitudinal axis of cam shaft 150 as the latter rotates.

Associated with each cam 152 is a follower 160 rotatably mounted on the end of a lever 162 pivotally fixed to the casing of a microswitch 164 and arranged to open the switch contacts by depressing the switch actuator 166.

Figure 20:
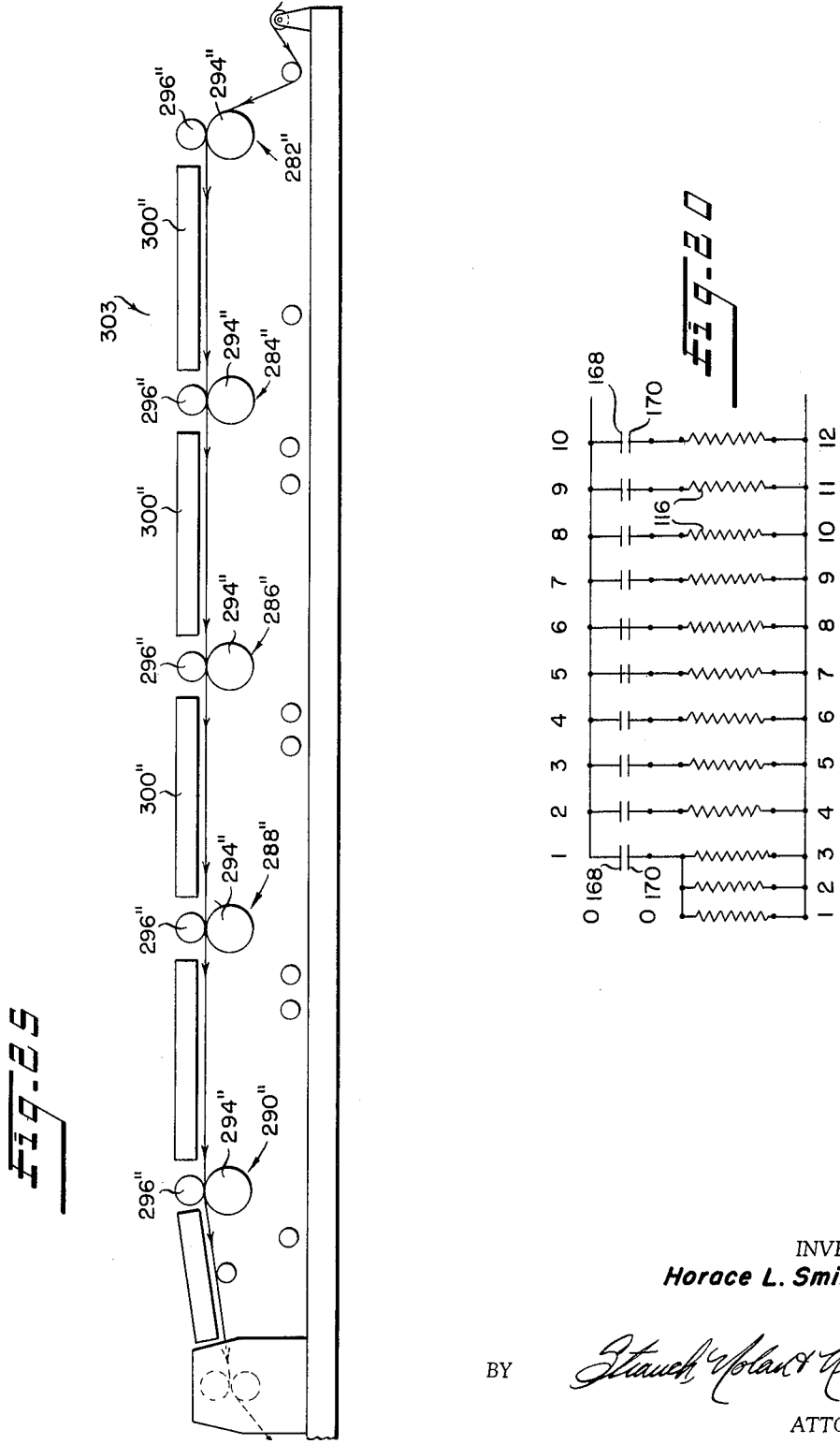
FIGURE 20 is a schematic wiring diagram of the radiant heaters regulated by the control system of FIGURE 13.

As is shown in FIGURE 20, the contacts 168, 170 of each microswitch 164 are interposed in series with one of the lamps 117.

At the normal press speed predetermined ones of the lamps 117 will be lighted. For example, in a given application, all of the lamps 117 except $117_4$, $117_8$, and $117_{10}$ might be lighted with the press running at its rated speed to project the optimum amount of radiant energy on carrier 115 as it passes beneath radiant heater bank 116. As long as printing press 109 runs at its rated speed, cam shaft 150 will remain in the position shown in FIGURE 19 and the levers 162 of all ten microswitches 164 except $164_4$, $116_8$, and $116_{10}$ will be disengaged from the switch actuators 166. Therefore, the contacts 168, 170 of these switches will be closed energizing all lamps 117 except $117_4$, $117_8$, and $117_{10}$. Should the speed of the carrier 115 leaving press 109 increase, vertical governor shaft 130 will rotate faster, increasing the centrifugal force on fly weights 142 and causing them to move outwardly from governor shaft 130, moving slidable collar 134 downwardly toward fixed collar 132 against the bias of spring 135. Rack 144 moves downwardly with collar 134, rotating pinion 146 and cam shaft 150 in a clockwise direction. Depending upon the angular increment through which cam shaft 150 is pivoted, the inner lands 156 of one or all of the cams $152_4$, $152_8$, and $152_{10}$ will be positioned opposite the followers 160 associated with those cams. The followers, therefore, will drop into the lower lands, disengaging them from the actuators 166 of the associated switches which will close, energizing the associated lamps 117 and increasing the rate at which radiant energy is emitted from radiant heater bank 116.

If carrier 115 slows down rather than speeding up, governor shafts 125 and 130 will rotate more slowly, decreasing the centrifugal force exerted on fly weights 142 and allowing spring 135 to move slidable collar 134 upwardly away from fixed collar 132. Rack 144 will, therefore, move upwardly, rotating pinion 146 and cam shaft 150 in a counterclockwise direction. Depending upon the degree to which the speed of carrier 115 decreases, and, therefore, the angle through which cam shaft 150 is rotated, one or more of the followers 160 will be forced up the inclined surfaces 158 of the associated cams 152 onto the outer lands of cams 154, causing the associated levers 162 to engage and depress the actuators 166 of the associated microswitches 164. Depression of actuators 166 opens switch contacts 168, 170, de-energizing the associated lamps 117 and decreasing the amount of radiant energy emitted from radiant heater bank 116.

This simple control mechanism is highly versatile since the sequence in which the various lamps 117 are cut in and out and the speeds at which this occurs can be varied at will merely by adjusting cams 152 relative to cam shaft 150 and by changing gears in drive train 148. It is to be understood, however, that my present invention does not depend for its unexpected, novel results solely upon the use of this control system, but that other types of systems may be employed and that, if variations in the amount of heat imparted to the carrier are not critical, such control systems may be eliminated altogether. It is to be further understood that the novel control system described above is not limited in application to use with the particular type of press shown in FIGURE 17, but that this control system may be used in conjunction with other types of coating, printing, and carrier impregnating apparatus as well as with other embodiments of my invention disclosed herein.

Referring now to FIGURE 21, press 109 also includes a press motor 218, and exhaust and supply fans 220 and 222. The press motor, supply and exhaust fans, and radiant heater banks 116 are operated by a source of power indicated by reference character 224. Radiant heater banks may be located at a single printing station or may be located at the several stations of a multi-color press, for example. Supply fan 222, which supplies operating air to the air knives (not shown) of the presses, is operated independently of press motor 218 and exhaust fan 220 by opening and closing a switch 226. Press motor 218 is operated by closing a combination on-off and web break switch 228. Switch 228, which is of conventional construction, is a small switch having an actuator in contact with carrier 115. The contacts of switch 228 are held closed by the paper. Thus, if the paper breaks, the switch contacts open, de-energizing the press motor 218.

The contacts of switch 228 are also interposed in a lead 230 connecting relays 232 to power source 224. The relay contacts 234 are disposed in series with the radiant heating units 116. When press motor 218 is stopped, relays 232 are de-energized, allowing their contacts 234 to open and interrupt the flow of operating current to the radiant heating units.

A manual switch 236 is also wired in series with each pair of radiant heating banks 116, permitting particular heating banks to be rendered inoperative if this is deemed desirable for a particular printing operation.

The operation of radiant heating banks 116 is also conditioned by an exhaust fan switch 238 and a low speed limit switch 240. Exhaust fan 220 and radiant heating banks 116 are wired in parallel to exhaust fan switch 238. Therefore, this switch must be closed before the radiant heating banks can be rendered operative. This ensures that, when the lamps in the heating banks are turned on, exhaust fan 220 will also be running to exhaust volatile materials evaporated by the lamps from the press room.

Limit switch 240 has normally open contacts 241 which are connected to press motor 218 through a connection indicated generally by reference character 242. When the press motor achieves its normal running speed, it closes the contacts of limit switch 240, completing a circuit between radiant heating banks 116 and power source 224. This ensures that press motor 218 will be running at normal operating speed before the lamps in the radiant heating banks are turned on so that carrier 115 will not be overheated and damaged.

The control system discussed above may also be employed to regulate the rate of energy emission from the lamps in the radiant heating banks 116 by, for example, installing a variable voltage device in the leads to the lamps instead of employing the novel control system illustrated in FIGURES 17–20.

*Offset letter press embodiment*

Figure 22:
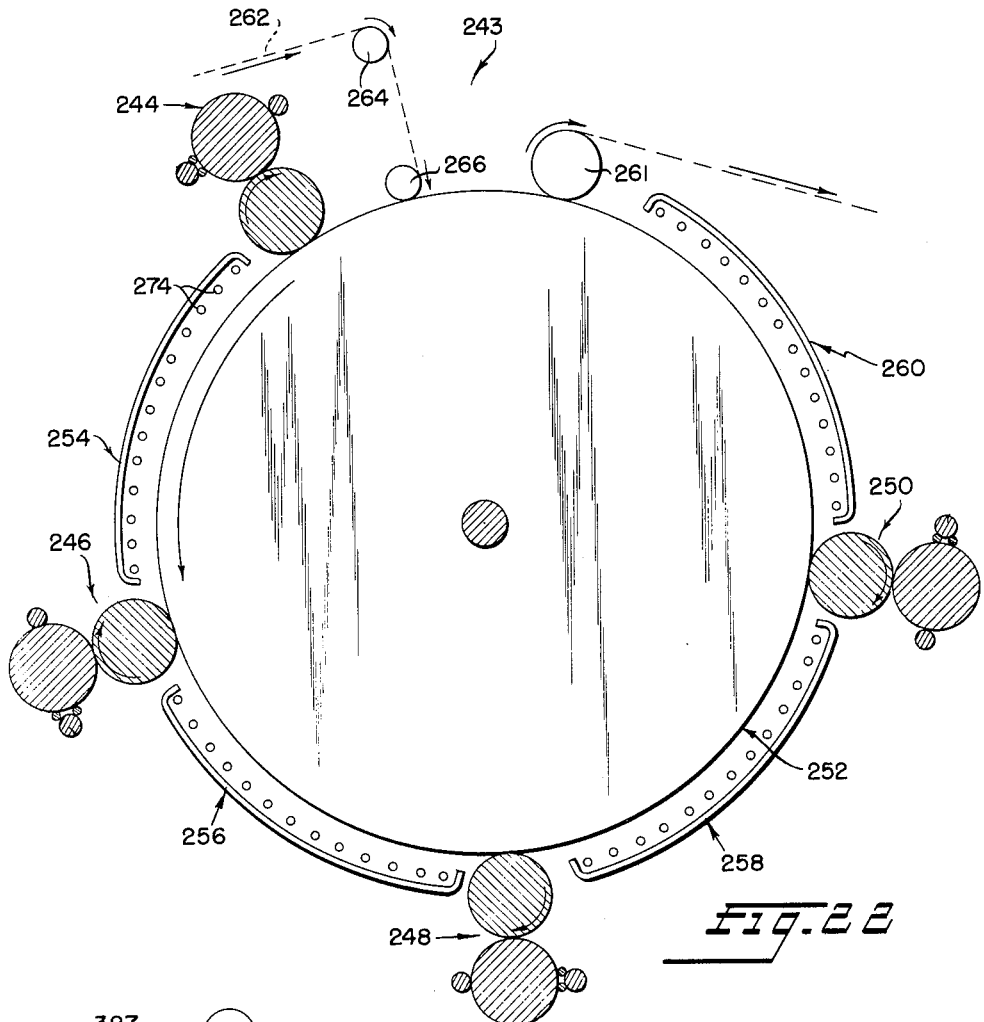
FIGURE 22 is a diagrammatic view of the invention applied to an offset letter press.

FIGURE 22 illustrates the application of my invention to an offset letter press 243 which has four printing stations 244, 246, 248, and 250 arranged at spaced intervals around the periphery of impression cylinder 252 between printing stations 244 and 246 is a radiant heating unit 254 of the type described above. Similar radiant heating units 256, 258, and 260 are located between printing stations 246 and 248, printing stations 248 and 250, and printing stations 250 and takeoff or chill roll 261, respectively. Carrier 262 is fed into press 243 over rollers 264 and 266 to printing station 244 which the lightest, generally yellow, ink is transferred from an inker 268 via a plate cylinder 270 and an offset cylinder 272 to the carrier. From printing station 244 the web passes beneath the lamps 274 in radiant heater bank 254 where radiant energy is projected onto the web 262 and absorbed by the yellow ink, evaporating the solvents from it. From radiant heater bank 254, the carrier passes successively through printing stations 246, 248, and 250 where successively darker inks, generally blue, red, and black, are applied to the web 262. After each of these printing stations the web passes under a radiant heating bank 256, 258, or 260 where the volatiles are evolved from the wet inks by the impinging radiant energy.

In the drying cycle, each of the four colors of ink receives radiant energy in an amount which is inversely proportional to its absorption coefficient; i.e., the least absorptive inks are subjected to incident radiation for the longest time and the most absorptive inks for the shortest. This ensures that even the lightest, most difficult to dry inks will be dry when the carrier comes off the press and eliminates the possibility of the carrier being burned through beneath the areas imprinted with black and other darker inks. As in the previously described embodiments, the lamps 274 in each of the four radiant heating banks 254, 256, 258, and 260 are preferably operated at temperatures which will provide maximum differential absorption of the radiant energy between the ink imprinted at the associated printing station and the carrier. Any heat absorbed by the carrier will be conducted away from it by chill roller 261 as the carrier is taken off the press.

*Rotogravure press embodiment*

FIGURE 23 illustrates a conventional, multi-color rotogravure press installation 280 which includes five presses 282, 284, 286, 288, and 290 through which the web 292 of material to be printed successively pass. At each printing station web 292 passes between a printing plate cylinder 294 and an impression cylinder 296 where the impression of cylinder 296 is transferred to web 292. The ink deposited on web 292 is dried by pre-heated, forced air driers 298 installed on each of the five presses. The ink dries very slowly, and it is necessary to guide web 292 in a tortuous path between printing stations to ensure that a given color of ink will be dry before the next printing station is reached. As a result of this requirement, and of the bulkiness of driers 298, rotogravure press installations require large amounts of space. In addition, the long paths between the impression cylinders in adjacent presses makes it difficult to properly register the different colors.

FIGURE 24 illustrates a conventional rotogravure press installation 299 modified in accordance with the principles of the present invention. Insofar as the components of this installation are like those of the conventional installation shown in FIGURE 23, they have been identified by the same reference characters primed. In rotogravure press installation 299, the cumbersome, bulky, inefficient, forced air driers 298 employed in existing installations are replaced by radiant heater banks 300 and 302 of the type described above. These heating units dry the inks printed on web 292 substantially faster than the conventional air driers, permitting web 292 to be routed directly from one printing station to the next. This significantly shortens the path between stations, decreasing space requirements and, in addition, eliminating the problem of registering colors described above.

As in the previously discussed embodiments, the lightest and most difficult to dry colors are preferably printed first so that they will be subjected to more incident radiation than the more easily dried colors. Additionally, as has also been previously discussed, the operating temperature of the lamps and the exposure time can be seaparately adjusted to ensure the most effective drying of each different color ink.

In new rotogravure press installations, even greater advantage may be taken of the principles of the present invention. A rotogravure press installation 303 of this type is shown in FIGURE 25 in which, insofar as the components of installation 303 are like those of the conventional installations shown in FIGURES 23 and 24, they have been identified by the same reference characters double primed. In the rotogravure press installation 303 illustrated in FIGURE 25, a single radiant heater bank 300″ is employed with each of the five presses 282″, 284″, 286″, 288″, and 290″. In this embodiment, the carrier 292″ is lead in a straight path through the five presses, minimizing the path between stations and reducing to a minimum space requirements and the problems encountered in properly registering the different colors printed by the five presses.

As in the previously discussed embodiments of my invention, the lightest and most difficult to dry colors are preferably printed first so that they will be subjected to more incident radiation than the more easily dried colors. Additionally, as has also previously been discussed, the operating temperatures of the lamps and the exposure times may be separately adjusted to ensure the most effective drying of each different color ink. As shown in FIGURE 25, radiant heater banks 300″ are preferably horizontally disposed closely adjacent the horizontally moving carrier 292″ to ensure the maximum incidence on carrier 292″ of the radiant energy emitted from radiant heater banks 300″.

*First transparent carrier embodiment*

Many materials are substantially transparent to radiant energy having wave lengths in the range of wave lengths which lamps of the type described above may be made to emit. For example, as shown in FIGURE 26, nylon film having a thickness of 0.004 inch will absorb only a negligible amount of radiant energy of a wave length between 4 and 5 microns. Other carrier materials having similar properties include Mylar, which is widely used as a packaging material, Dacron, Orlon, Celanese Acetate, and Saran to name but a few. Also, materials such as white paper readily transmit radiant energy of shorter wave lengths (see FIGURE 3).

FIGURE 27 illustrates diagrammatically the application of the principles of my invention to the drying of carriers which are substantially transparent to radiant energy. The drier 310 illustrated in FIGURE 27 includes a radiant heating unit 312 and a reflector 314 between which the material 316 to be dried passes. Radiant heating unit 312 is preferably of the type described above, consisting of a row of lamps 318 surrounded by a reflector 320. Plenum chambers 321 are formed on the rear sides of reflectors 314 and 320. Air is circulated through plenum chambers 321 to cool the reflectors and prevent them from being burned out by the intense beam of radiant energy emitted from lamps 318.

As carrier 316 passes through drier 310, the radiant energy emitted from lamps 318 is directed against it. Energy striking printed or coated portions of the carrier is absorbed and the remainder passes through the carrier and strikes the inner polished surface of reflector 314. Reflector 314 reflects the transmitted radiant energy back onto the carrier, ensuring that the maximum proportion of the emitted energy is absorbed by the printing or coating on the carrier. As shown by FIGURE 28, the preferred reflector materials have reflectivity coefficients approaching 1.0 for radiant energy in the range of wave lengths discussed above and, therefore, will reflect back onto carrier 316 substantially all of radiant energy impinging upon them. Since the carrier is transparent to radiant energy, lamps 318 may be operated at a temperature producing the wave lengths of energy most readily absorbed by the coating or ink on the carrier, permitting the ink or coating to be dried at a maximum rate with very little if any absorption of energy by the carrier. As a result, this method is highly efficient and a significant improvement over the methods of drying such materials heretofore employed.

This method is also highly versatile. For example, if the carrier is transparent to radiant energy, the radiant heating unit 312 may be disposed on the side of carrier 316 opposite that on which the coating or ink is deposited since the radiant energy will readily pass through the carrier and be absorbed by the ink or coating on its opposite side. Moreover, with only slight modification, the apparatus shown in FIGURE 27 may be adapted to dry carriers printed by the blanket-to-blanket process in which the carrier is printed on both sides. In this case, reflector 314 is replaced with a heating unit identical to that identified in FIGURE 27 by reference character 312.

In this application, the reflectors 320 surrounding the lamps 318 in the two heating units will serve the function of the reflector 314.

Second transparent carrier embodiment

Figure 29:
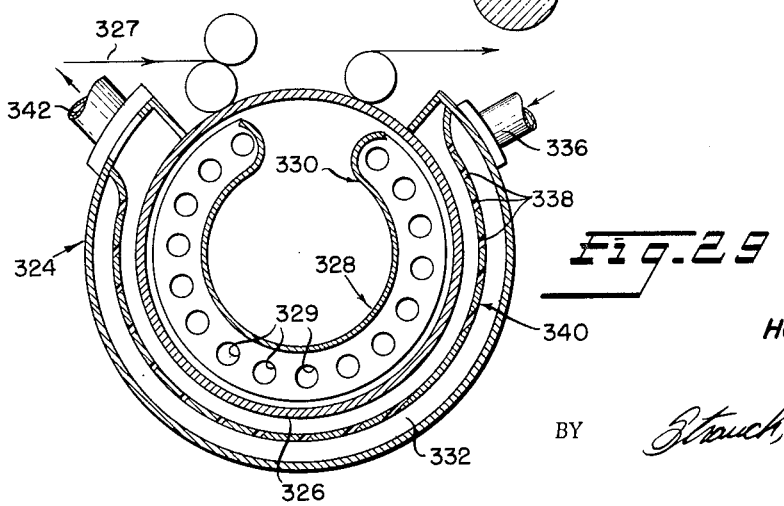
FIGURE 29 is a diagrammatic view of another form of apparatus for drying materials on transparent carriers.

FIGURE 29 illustrates a drier 324 which is also particularly suited for drying inks and coatings on transparent carriers. Drier 324 includes a hollow, rotatable drum 326 made of material substantially transparent to radiant energy of the wave length used to dry the particular material on carrier 327. A radiant heating unit 328 comprising a bank of lamps 329 surrounded by a reflector 330 is disposed within hollow drum 326. Lamps 329 may be of the tungsten filament, quartz envelope type described above.

Disposed adjacent the outer surface of rotatable drum 326 is an air hood forming a plenum chamber 332 through which cooling air may be circulated to cool carrier 327 and to remove evolved volatiles from adjacent its surface. The cooling air is forced into plenum chamber 332 through an inlet 336. From the plenum chamber, the cooling air passes through nozzles 338 in a baffle plate 340 which direct the air against the printed or coated surface of carrier 327. After impinging upon carrier 327, the cooling air is exhausted from plenum chamber 332 through an outlet 342.

Like the drier illustrated in FIGURE 27, the lamps 329 of drier 324 may be operated at the temperature emitting radiant energy of the wave length most readily absorbed by the printing or coating on carrier 327.

Drying on reflective carriers

In addition to the specific applications discussed above, the driers illustrated in the accompanying drawings may be advantageously employed to dry inks or other coatings on highly reflective material such as aluminum foil and metalized surface materials. In employing my novel driers for this purpose, I preferably utilize radiant energy having a wave length somewhat longer than the optimum discussed above for drying coatings and the like on less reflective materials. Referring to FIGURE 1, polished aluminum has very low absorptivity of radiant energy of a wave length on the order of 2–3 microns, for example. At this same wave length, coating materials, regardless of their color, will absorb a high proportion of the incident radiant energy. For example, as shown by FIGURE 1, at a wave length of 2–3 microns radiant energy is absorbed almost as readily by white and red paints as by black. Therefore, by employing radiant energy having a wave length around 2–3 microns, differential absorption of the coating or ink and the carrier may be obtained, permitting maximum drying rates with minimum absorption of heat by the carrier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process of drying one or more materials on or impregnated in a carrier traveling at a high velocity, comprising:
    (a) providing a heating zone having an effective length in the direction of motion of said carrier;
    (b) projecting radiant energy onto said carrier in the heating zone at wave lengths that will be readily absorbed by the material and absorbed to a substantially smaller extent by the carrier, said wave lengths being not shorter than about 0.4 micron; and
    (c) maintaining the absorbed radiant energy constant by varying the flux density of the radiant energy in proportion to changes in velocity of said carrier without substantial variation in the wave lengths of said radiant energy.

2. The process as defined in claim 1, wherein the materials to be dried are applied to or impregnated in one side of the carrier and the radiant energy is directed solely against the opposite side of the carrier and transmitted through said carrier to said materials.

3. The process as defined in claim 2, together with the step of reflecting back onto said carrier substantially all of the radiant energy transmitted through and reflected therefrom to ensure maximum absorption of said radiant energy by said materials by reflecting said energy back onto said carrier from both sides thereof from reflecting surfaces substantially coextensive with the heating zone.

4. The process as defined in claim 3, including the step of blowing cool air across said reflecting surface to protect them from overheating.

5. The process as defined in claim 1, wherein said radiant energy is projected onto said carrier from a plurality of separately energizable radiant energy sources and the flux density of the radiant energy in the heating zone is varied by energizing and de-energizing selected ones of said sources as the velocity of the carrier through the heating zone increases and decreases.

6. The process as defined in claim 1, together with the step of supporting said carrier on an air cushion while it is being irradiated.

7. The process as defined in claim 1, together with the step of directing a flow of cool, humid air against the irradiated carrier to remove volatiles from adjacent its surface and to cool said carrier and replace moisture evaporated therefrom by said radiant energy.

8. The process as defined in claim 7, wherein air is exhausted from adjacent said carrier at a rate higher than said humid air is supplied thereto to prevent the evolved constituents from escaping into the surrounding ambient atmosphere.

9. The process as defined in claim 7, wherein the relative humidity of the cooling air is increased to substantially 100% to maximize its heat carrying capacity and its ability to restore moisture to the carrier.

10. The process as defined in claim 7, wherein the rate of cooling said carrier is increased by conducting heat therefrom during the drying cycle.

11. The process as defined in claim 7, wherein said cooling air is directed against said carrier at a velocity in the range of 6–10,000 feet per minute.

12. The process as defined in claim 1, together with the steps of concomitantly applying a plurality of materials to be dried to said carrier and adjusting the wave lengths of the radiant heat employed to dry said materials to a range in which the differential between the absorption coefficients of the materials is minimized and the differential between the absorption coefficients of said carrier and the absorption coefficients of said materials is maximized.

13. A process for drying multi-colored inks upon a carrier traveling at high velocity, comprising the steps of:
    (a) applying a different colored ink on and thereafter projecting radiant energy onto said carrier at separate successive stations along said carrier, the radiant energy sources at each station being of wave lengths individually regulated to provide radiant energy of wave lengths that will be readily absorbed by the colored ink deposited at that station and less readily absorbed by the carrier, said wave lengths being not shorter than about 0.4 micron; and
    (b) controlling the radiant energy projected at each of said stations in direct relation to the velocity of said carrier without substantial change in the wave lengths of said radiant energy.

14. The process as defined in claim 13, wherein each ink applied to said carrier has a higher radiant energy absorption coefficient than the ink therebefore applied thereto, whereby the least absorptive inks are irradiated for the longest periods.

15. The process of drying material on or impregnated in a carrier moving at high velocity, comprising the steps of:
  (a) irradiating said carrier with energy having wave lengths not shorter than about 0.4 micron to evaporate volatile constituents from said material; and
  (b) during the irradiation of said carrier, rapidly heating said carrier to a predetermined temperature above the boiling points of the volatile constituents in the material being dried to facilitate the evaporation of said volatile constituents and below the temperature at which the carrier would be heat damaged to protect said carrier against heat damage from absorption of said radiant energy by establishing adjacent said carrier a conductive heat sink capable of conducting heat therefrom at a rate sufficient to maintain the temperature of the carrier at about said predetermined temperature.

References Cited by the Examiner

UNITED STATES PATENTS

| | | | |
|---|---|---|---|
| 2,144,919 | 1/1939 | Gantreau | 34—23 |
| 2,236,754 | 4/1941 | Gurwick | 101—416 |
| 2,245,797 | 6/1941 | Makarius | 101—416 |
| 2,268,985 | 1/1942 | Hess | 101—416 |
| 2,268,986 | 1/1942 | Hess et al. | 101—416 X |
| 2,268,987 | 1/1942 | Hess et al. | 34—23X |
| 2,269,751 | 1/1942 | Barnes | 34—4 |
| 2,306,607 | 12/1942 | Horton | 34—23 |
| 2,319,853 | 5/1943 | Durham | 101—416 |
| 2,420,399 | 5/1947 | New | 34—4X |
| 2,445,120 | 7/1948 | Levinson et al. | 34—4 |
| 2,642,000 | 6/1953 | Wieking | 101—416 |
| 2,674,809 | 4/1954 | Meienhofer | 34—48 |
| 2,768,576 | 10/1956 | Dietrich | 101—177 |
| 3,078,587 | 2/1963 | Huck | 34—48 |
| 3,159,464 | 12/1964 | Early et al. | 101—416X |

ALDEN D. STEWART, *Primary Examiner.*

DAVID KLEIN, WILLIAM B. PENN, *Examiners.*